US008310880B2

(12) United States Patent
Kuehne et al.

(10) Patent No.: US 8,310,880 B2
(45) Date of Patent: Nov. 13, 2012

(54) VIRTUAL CHANNEL SUPPORT IN A NONVOLATILE MEMORY CONTROLLER

(75) Inventors: Reinhard Kuehne, Reichenau (DE);
Vivian Chou, Torrance, CA (US)

(73) Assignee: 248 Solid State, Inc., Santa Clara, CA (US)

( * ) Notice: Subject to any disclaimer, the term of this patent is extended or adjusted under 35 U.S.C. 154(b) by 431 days.

(21) Appl. No.: 12/718,944

(22) Filed: Mar. 5, 2010

(65) Prior Publication Data

US 2011/0219171 A1    Sep. 8, 2011

(51) Int. Cl.
*G11C 7/10* (2006.01)

(52) U.S. Cl. ........ 365/189.011; 365/189.04; 365/189.17

(58) Field of Classification Search ........... 365/189.011, 365/189.04, 189.17, 189.18, 185.22, 185.23, 365/226
See application file for complete search history.

(56) References Cited

U.S. PATENT DOCUMENTS

| 6,754,765 | B1 | 6/2004 | Chang et al. | |
| 7,185,162 | B1* | 2/2007 | Snyder | 711/165 |
| 7,589,799 | B2* | 9/2009 | Lai | 349/42 |
| 7,653,778 | B2* | 1/2010 | Merry et al. | 711/103 |
| 8,078,918 | B2* | 12/2011 | Diggs et al. | 714/42 |
| 2008/0049513 | A1 | 2/2008 | Jeong et al. | |
| 2008/0147994 | A1 | 6/2008 | Jeong et al. | |

OTHER PUBLICATIONS

"1G×8 Bit / 2G×8 Bit / 4G×8 Bit NAND Flash Memory", published in 2005 by Samsung Electronics Co., Ltd, 50 pages.
Serial ATA, Native Command Queuing "An Exciting New Performance Feature for Serial ATA", A Joint Whitepaper by Intel Corporation and Seagate Technology, Jul. 2003, 12 pages.
Serial ATA, Advanced Host Controller Interface, (ACHI) 1.3, Jun. 2008, 15 pages.

* cited by examiner

*Primary Examiner* — Gene Auduong
(74) *Attorney, Agent, or Firm* — Silicon Valley Patent Group LLP; Omkar Suryadevara

(57) ABSTRACT

A controller uses N dedicated ports to receive N signals from N non-volatile memories independent of each other, and uses a bus in a time shared manner to transfer data to and from the N non-volatile memories. The controller receives from a processor, multiple operations to perform data transfers, and stores the operations along with a valid bit set active by the processor. When a signal from a non-volatile memory is active indicating its readiness and when a corresponding operation has a valid bit active, the controller starts performance of the operation. When the readiness signal becomes inactive, the controller internally suspends the operation and starts performing another operation on another non-volatile memory whose readiness signal is active and for which an operation is valid. A suspended operation may be resumed any time after the corresponding readiness signal becomes active and on operation completion the valid bit is set inactive.

12 Claims, 15 Drawing Sheets

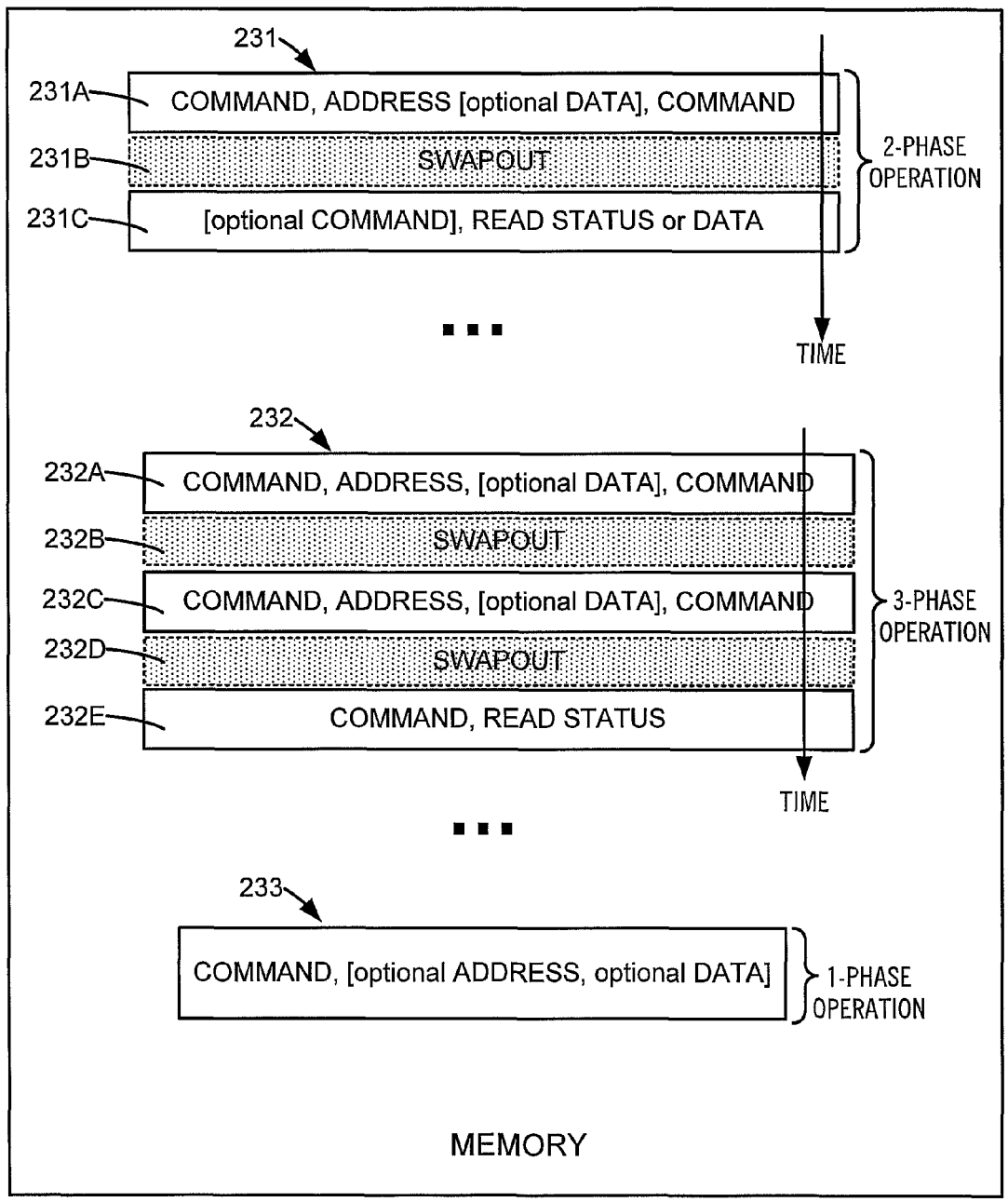

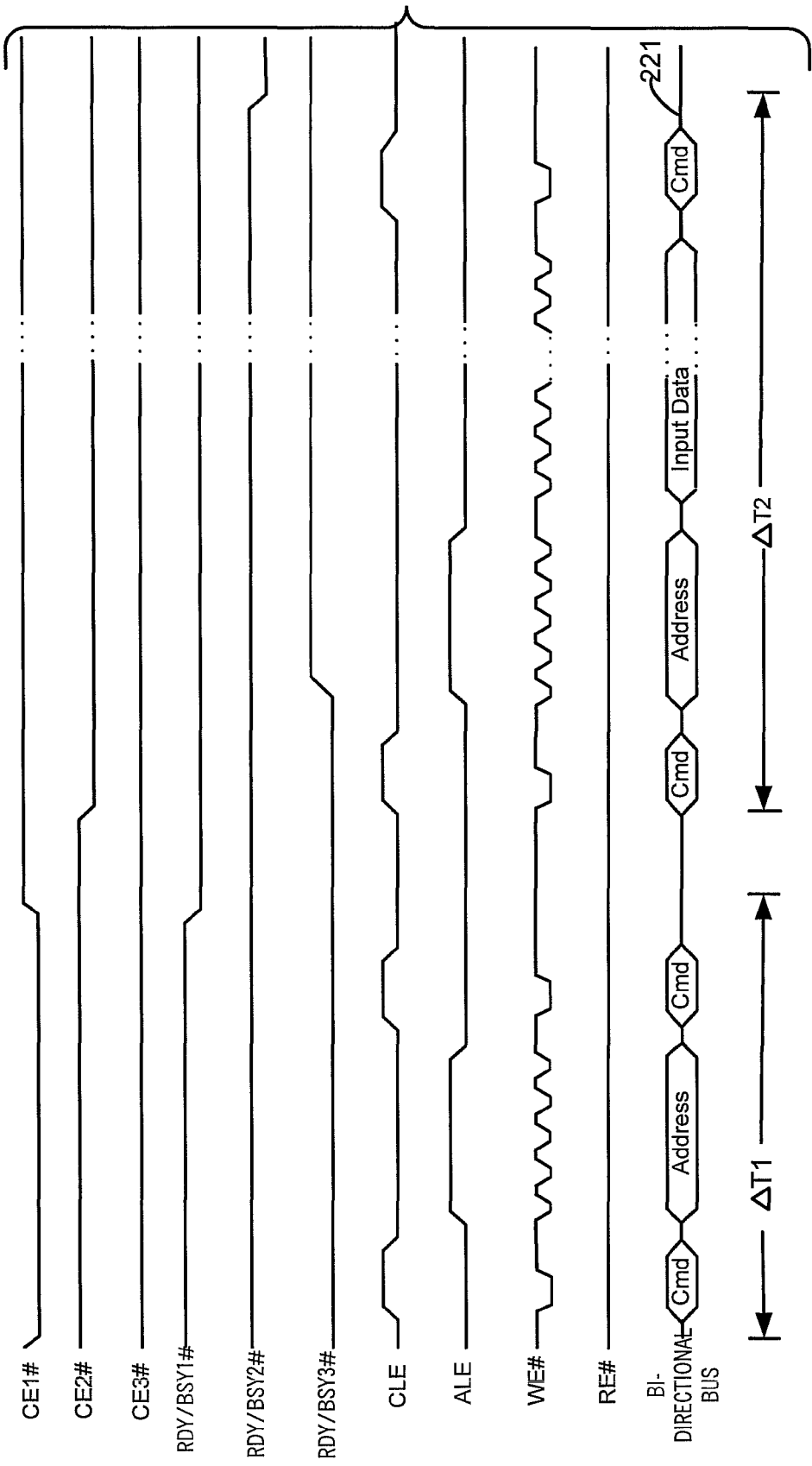

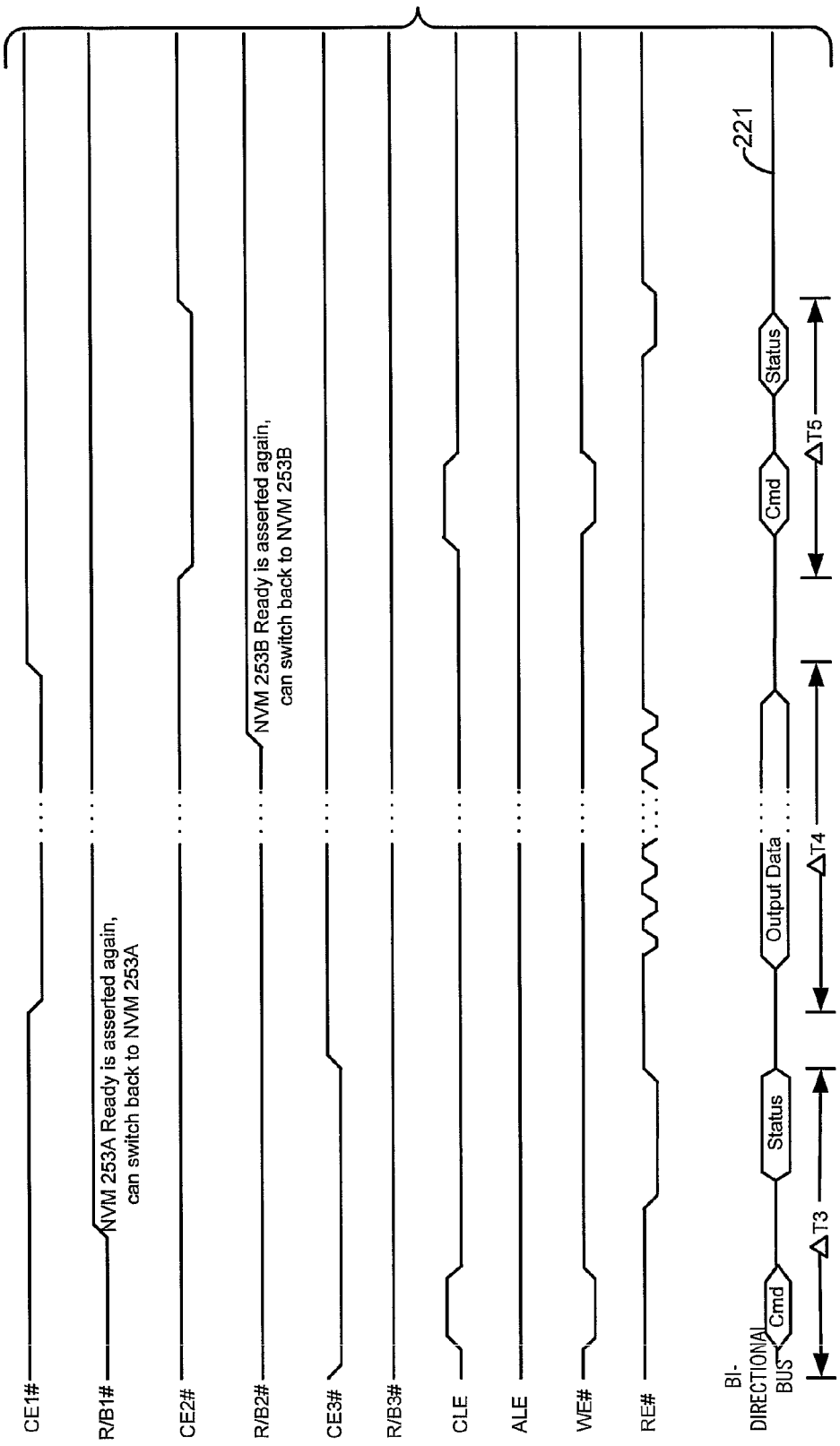

VIRTUAL CHANNEL SUPPORT IN A NONVOLATILE MEMORY CONTROLLER

BACKGROUND

Prior art flash memory chips (also called simply "flash memories") 101 and 102 (FIG. 1A) internally contain one or more arrays of cells that are formed of NAND logic gates or NOR logic gates or some combination thereof. Flash memories 101 and 102 are typically coupled to interface logic (also called "processor" or "flash controller") 104A as illustrated in FIG. 1A. The combination of flash memory chips 101 and 102 and interface logic 104A (FIG. 1A) are typically used by other hardware (not shown) in a prior art device 100A (FIG. 1A), to store data in a flash manner. Examples of prior art device 100A are a music player, a cell phone, a personal digital assistant, or a computer. Note that the prior art device 100A of FIG. 1A includes a direct memory access (DMA) controller 105 in an electronic component (also called "processor" or "flash controller") 104A which can operate faster than another electronic component 104B (FIG. 1B) that does not have a DMA controller, as shown in a similar prior art device 100B (FIG. 1B).

Prior art device 100A (FIG. 1A) typically includes a bi-directional bus (also called input-output bus or "I/O bus") 103I that can be used at any given moment in time to transfer data and/or address signals (e.g. 8 bits at a time) between flash controller 104A and any one of flash memories 101 and 102. Prior art device 100A further includes multiple control buses 103C1, 103C2 that are typically used simultaneously at the given moment in time (during data/address transfer) to additionally transfer control signals between flash controller 104A and a corresponding one of flash memories 101 and 102. Typically, while flash controller 104A is communicating with one flash memory 101 by transferring commands and/or addresses and/or data over I/O bus 103I, the other flash memory 102 cannot use I/O bus 103I and vice versa. Hence, prior art flash controller 104A known to the inventors waits for flash memory 101 to complete before communicating with flash memory 102.

Prior art processor 104A may store data in flash memory 101 by executing a prior art method 110 of the type illustrated in FIG. 1C. Specifically, in a first act 111, flash controller 104A issues a write command to flash memory 101 (also called chip #1) including, for example toggling a write enable (WE) line once while driving active a chip enable (CE) line and a command latch enable (CLE) line to chip #1 via flash control bus 103C (FIG. 1A), and simultaneously driving command signals via I/O bus 103I (FIG. 1A). Next, by toggling the write enable (WE) line while driving active a chip enable (CE) line and an address enable (ALE) line and simultaneously driving address signals on I/O bus 103I, an act 112 is performed wherein flash controller 104A (FIG. 1A) writes an address to chip #1, via I/O bus 103I. Next, while toggling the write enable (WE) signal on the flash control bus 103C and driving the CE line active and simultaneously holding both CLE and ALE lines inactive, another act 113 is performed wherein flash controller 104A writes data to chip #1, also via I/O bus 103I. To summarize, data to be stored in a flash manner are transferred via the shared I/O bus 103I to chip #1, which temporarily holds the data in a buffer (also known as a "page buffer").

Next, while toggling the WE signal and simultaneously driving active the CE and CLE signals on the flash control bus 103C, act 114 is performed wherein flash controller 104A issues a program command to chip #1 to write the data from the page buffer to its internal array of cells at an address that was specified in act 112 (and received via I/O bus 103I). Chip #1 responds to the program command from flash controller 104A after completing the write to its internal array of cells, followed by reading back the stored data from the specified address and comparing the read-back data with data in the page buffer. The result of comparison is stored by chip #1 in a readiness register that is accessible to flash controller 104 via I/O bus 103I.

Hence, to the knowledge of the current inventors, prior art flash controller 104A enters a loop to check on readiness of chip #1 as per act 116. The specific loop entered at this stage depends on the design of prior art device 100A. In one implementation, in act 115, flash controller 104 retrieves the value of a readiness register or status register in chip #1 and then in act 116 it checks whether the just-retrieved value from chip #1 indicates that chip #1 is ready. Alternatively, prior art flash controller 104A may monitor a ready/busy line in control bus 103C1, driven by chip #1 (as illustrated by branch 162 in FIG. 1C).

A ready signal of chip #1 typically becomes active after chip #1 completes the previously-issued commands, namely the program command in act 114. Hence, when the program command is completed, the ready signal from chip #1 goes active, and flash controller 104A then performs act 117 to check if the copy-back by chip #1 indicates a match in the comparison of data (between the internal array and the page buffer). If there was a match, the write command completed successfully, and flash controller 104A exits method 110, for chip #1.

Referring back to method 110, in case the program command is found in act 117 to have failed, prior art flash controller 104 goes to act 118 to perform error-handling actions, e.g. map out a block at the previously-specified address and issue another program command at a different address of another block in chip #1 (in order to re-write the same data), and thereafter exits. After exiting method 110, flash controller 104 may start performing method 110 again, for a new operation. For example, the new operation may be to store new data on either one of chip #1 and chip #2. Alternatively, the new operation may be to retrieve previously-stored data from any one of chips #1 and #2, for example. Note that prior art flash controller 104 performs method 110 (and hence an operation) on only one of chips #1 and #2 at any given time.

A data sheet entitled "1 G×8 Bit/2 G×8 Bit/4 G×8 Bit NAND Flash Memory" published in 2005 by SAMSUNG Electronics CO., LTD is incorporated by reference herein in its entirety. This data sheet discloses a prior art method of interleaving the programming of a page of data between two K9F4G08U0M dies that are identical to one another and are included in a single K9K8G08U0M package. The interleaving method of this data sheet is illustrated by a timing chart shown in FIG. 1D (attached hereto for convenience), for a page programming operation. As stated in the data sheet, a host can issue a page program command to chip #2 in state A while chip #1 is already executing a page program operation. In state C, the system should issue a F1h command to detect the status of chip #1. If chip #1 is ready, a bit 6 in the status register is set to "1" and the system can issue another page program command to chip #1. Although FIG. 1D illustrates just a write operation, the just-described data sheet also includes other interleaved operations, such as block erase, and two-plane page programming. Accordingly, the data sheet should be reviewed for further details.

The inventors of the current patent application note that above-described prior art interleaving method has certain limitations and constraints. Firstly, the inventors note that the same type of operation is described as being interleaved between chip #1 and chip #2, e.g. both chip #1 and chip #2 perform a write operation in FIG. 1D. This is an explicit limitation of prior art in the above-described data sheet, because the data sheet says that during interleave operations, the "70h" command (to read status register) is prohibited. Secondly, the method depicted in FIG. 1D can be used only in a specific prior art design where two dies share a single ready/busy line. This specific prior art design may use for example, 4 dies placed in the same package, with 2 dies sharing one chip enable (CE) line and one ready-busy (RB) line. Hence, only when both dies in a package are ready does the shared ready-busy (RB) line become active. However, a special command must be used to check the readiness of a specific die within a package that uses a single ready-busy (RB) line to signal the status of multiple dies therein. Also, the current inventors note a prior art need for the host to issue the F1h command in state C to detect status, which appears to require the host to poll each chip before issuing another command. Accordingly, the current inventors believe that improvements to such prior art methods and apparatuses are desired.

SUMMARY

A controller in accordance with the invention includes one or more interfaces to non-volatile memory (NVM). An NVM interface is coupled to a corresponding group of NVMs. Each group of NVMs is coupled to its corresponding NVM interface by a bi-directional bus that is shared by NVMs in the group. Each NVM interface receives multiple NVM operations to be performed (e.g. from a processor), and each NVM operation is to be performed by an individual NVM within the group. Each NVM operation identifies a single NVM uniquely, from among NVMs in the group corresponding to the NVM interface that receives the NVM operation.

Each NVM operation is segmented into multiple phases to be performed in a predetermined sequence relative to one another, e.g. a command phase followed by one or more data phases. The specific manner in which an NVM operation is segmented in accordance with the invention can be different, depending on the type of NVM operation. After receipt of an NVM operation, an NVM interface uses the bi-directional bus (via a set of bidirectional input-output pins coupled thereto) to instruct an NVM in its corresponding group, to initiate performance of a phase of the received NVM operation, such as a command phase.

While the just-described NVM ("first NVM") is internally busy in performing the just-described phase ("first phase"), the NVM interface uses the same bi-directional bus (via the same set of bidirectional input-output pins) to communicate with another NVM ("second NVM"), e.g. to initiate performance of another command phase. While the second NVM is internally busy, the NVM interface may further use the shared bi-directional bus to communicate with yet another NVM in the corresponding group, depending on its readiness. For example, if at this stage the first NVM has finished performance of the command phase, the NVM interface may use the shared bi-directional bus to resume performance of the first NVM operation, e.g. by initiating performance of a data phase.

Segmenting each NVM operation into phases, and interleaving the performance of phases of different operations by different NVMs as described above increases utilization of a bi-directional bus that is shared by the NVMs to a level not previously achieved in any prior art known to inventors. Specifically, as noted above, instead of waiting for an NVM to complete an operation as a whole, the above-described NVM interface repeatedly uses the shared bus to initiate performance of other operations' phases by other NVMs. In this manner, an NVM interface in accordance with the invention implements multiple virtual channels over a single bus that is shared by multiple NVMs.

BRIEF DESCRIPTION OF THE FIGURES

FIG. 2B illustrates NVM operations 231 and 232 that have been segmented into two phases and three phases respectively, in accordance with the invention.

FIGS. 3A and 3B illustrate, in timing diagrams, signals on dedicated ports and on a shared port of a NVM interface 200 of the type illustrated in FIGS. 2A-2E in accordance with the invention.

DETAILED DESCRIPTION

In accordance with the invention, circuitry in an non-volatile memory (NVM) interface 200 (FIG. 2A) has input-output pins 220 coupled to a group 253 of non-volatile memories (NVMs) 253A-253N, by a bi-directional bus 221 to be used by the NVMs 253A-253N as directed by NVM interface 200. As bus 221 is shared, at any given moment in time when any NVM 253I is transferring data to/from NVM interface 200, all other NVMs in group 253 cannot use bus 221 ("NVM bus"). Therefore, in many aspects of the invention, as soon as an NVM 253I no longer uses NVM bus 221, NVM interface 200 instructs any other NVM to use NVM bus 221, so as to improve bus utilization during the time NVM 253I is busy, as discussed below.

Figure 1A:
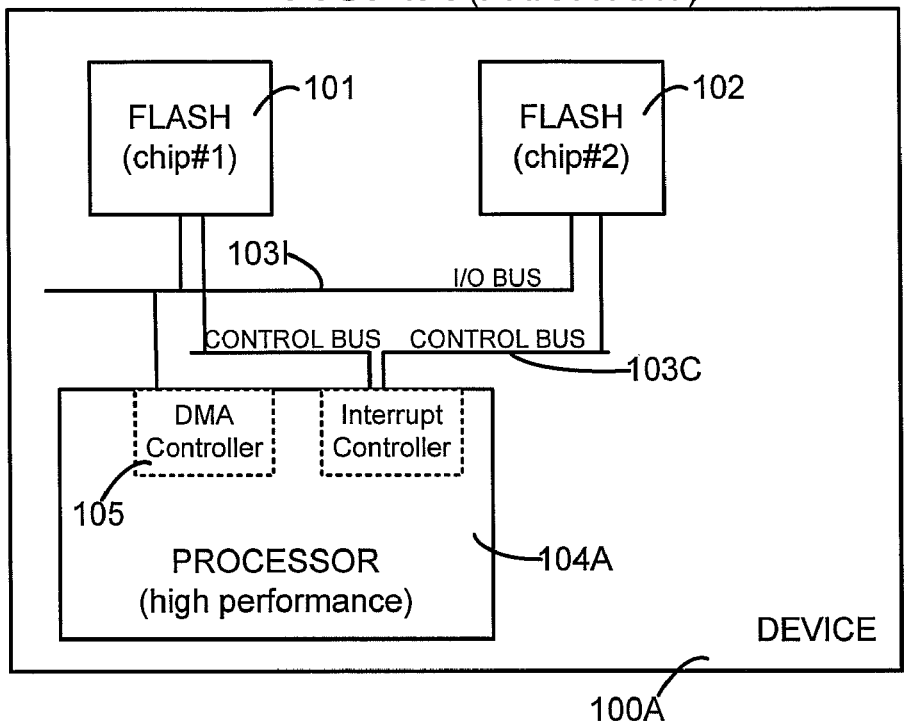
FIGS. 1A and 1B illustrate, in respective block diagrams, examples of an electronic device of the prior art which includes flash memories 101 and 102 typically coupled to interface logic (also called "processor" or "flash controller").
Figure 1B:
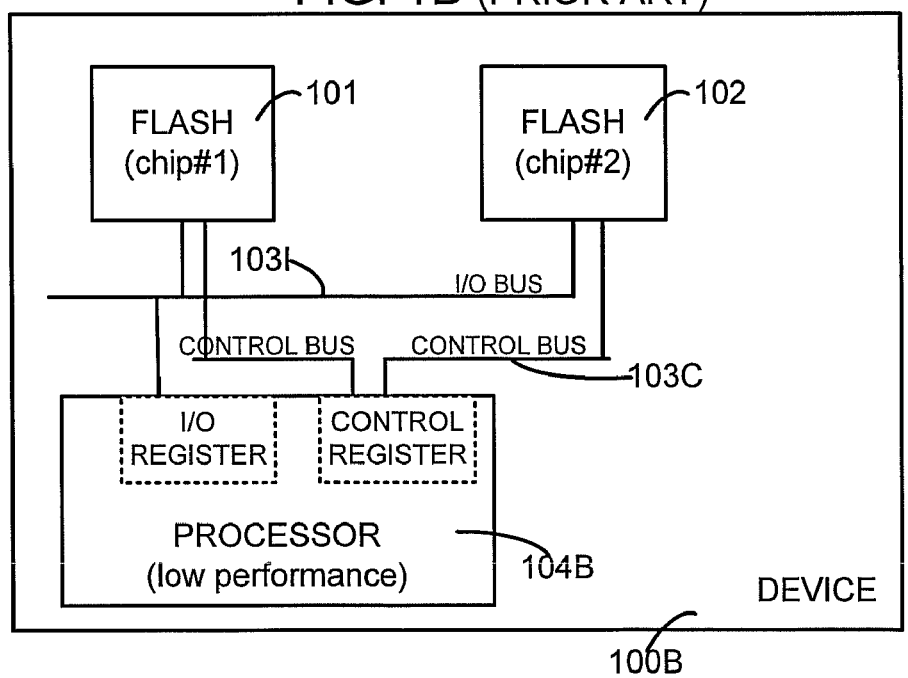
Figure 1C:
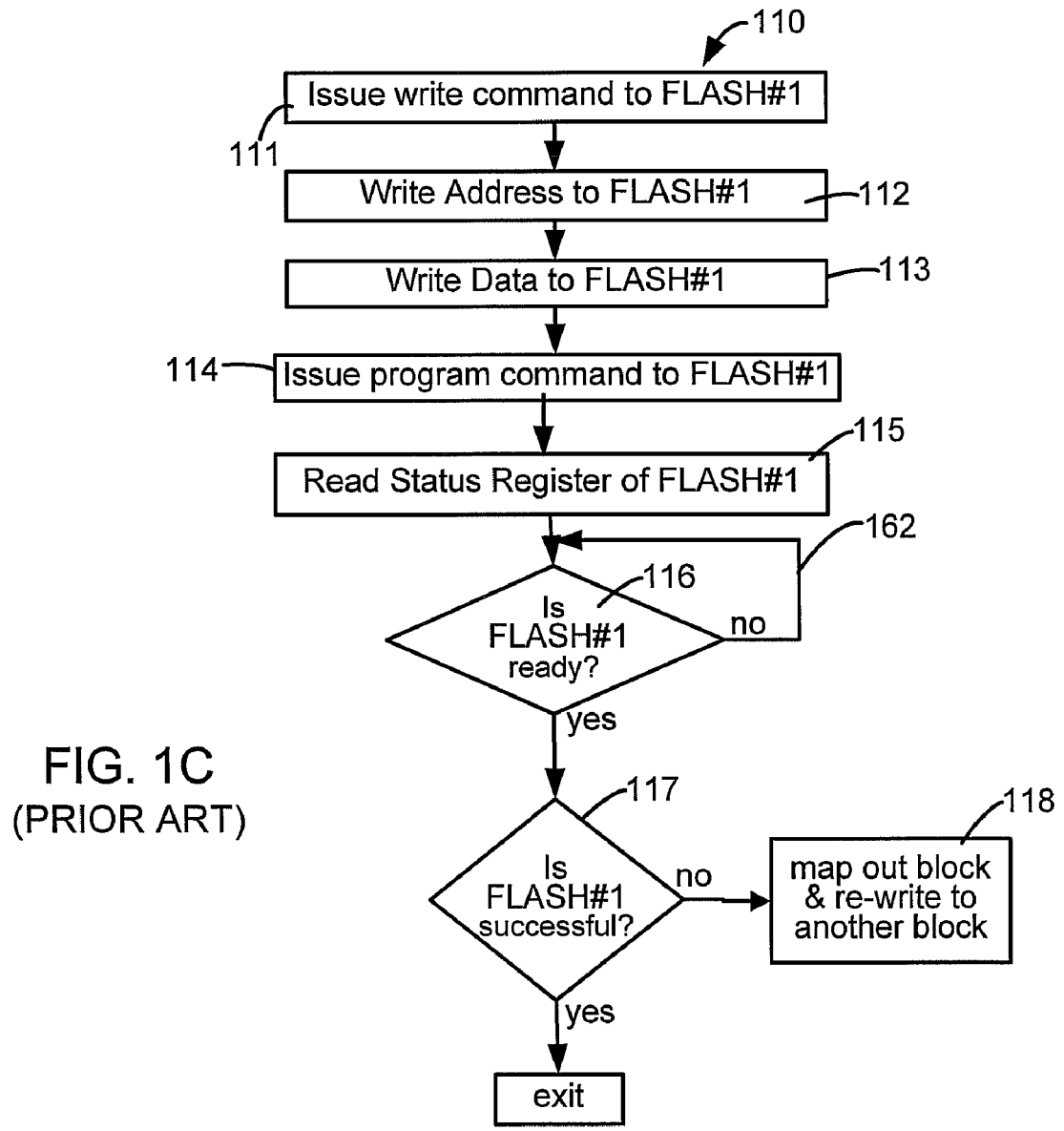
FIG. 1C illustrates, in a high-level flow chart, steps of a prior art method performed by the flash controller ASIC of FIG. 1A to store data in a flash memory.
Figure 1D:
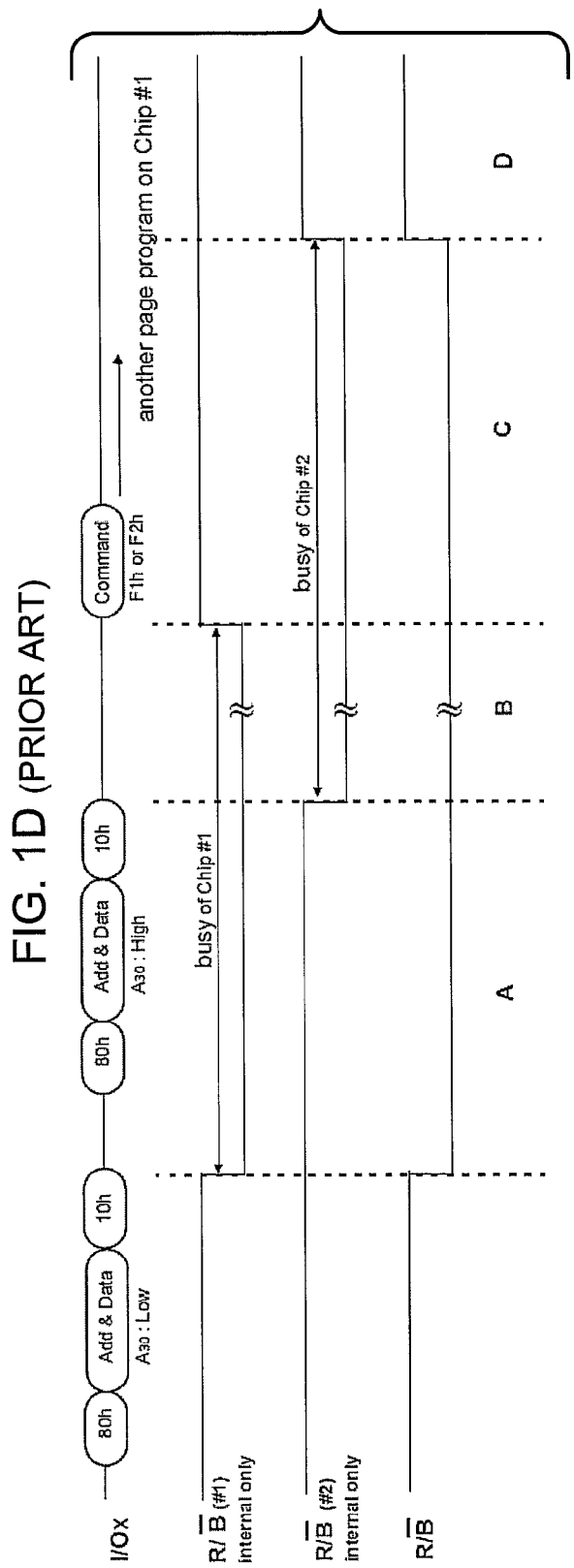
FIG. 1D illustrates, in a timing diagram, signals representing a special command transmitted by the prior art flash controller on an I/O bus to the two flash memories of FIG. 1A that are controlled by a single common ready/busy line RIB, and signals generated by the flash memories on a control bus in response.
Figure 2A:
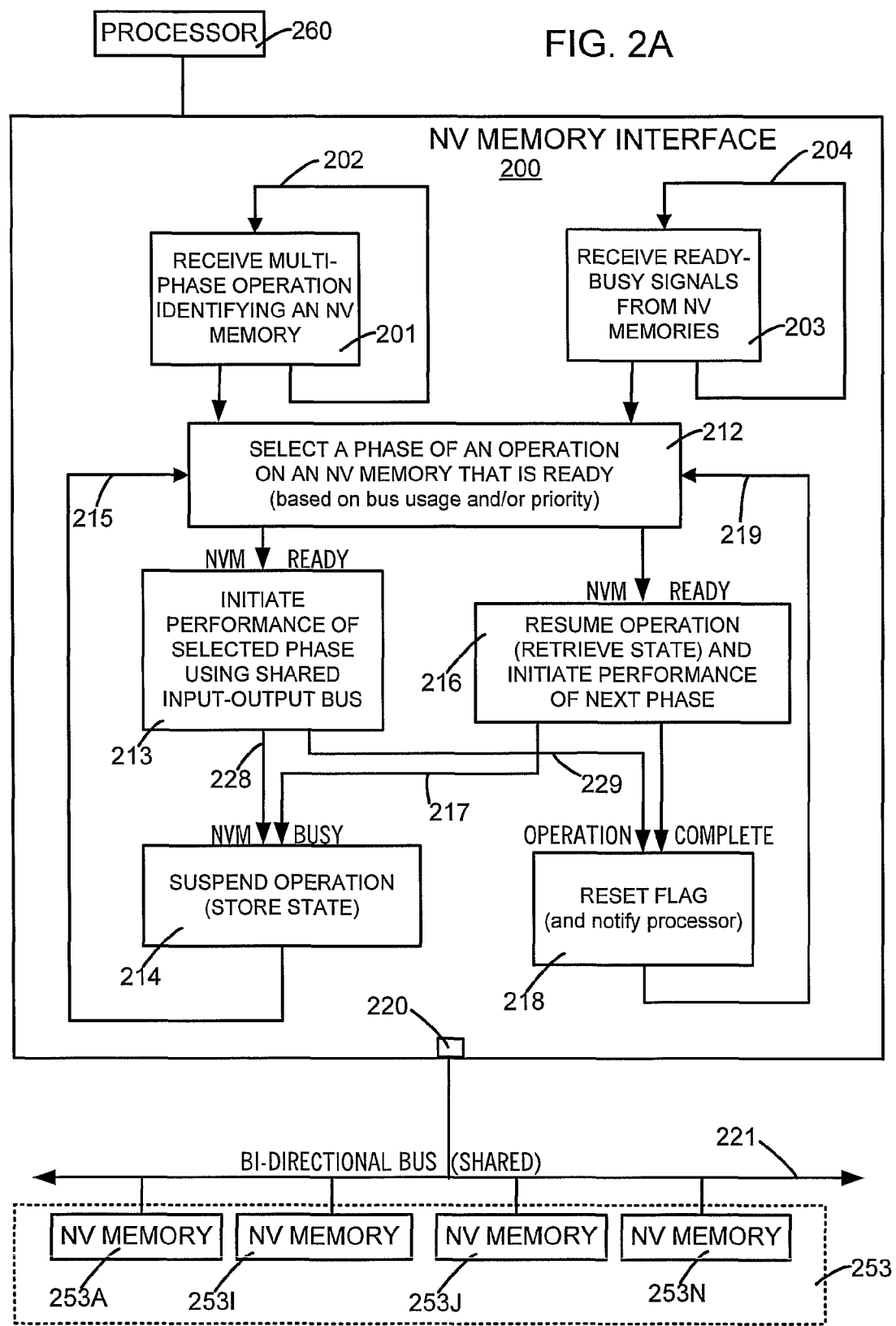
FIG. 2A illustrates, in a flow cart, a method performed by a non-volatile memory interface 200 in accordance with the invention, to transfer data to and from non-volatile memories 253A-253N, by interleaved usage of a shared bi-directional bus 221 coupled therebetween.

Referring to FIG. 2A, NVM interface 200 receives (in an act 201) an NVM operation to be performed, for example from a processor 260. Act 201 may be performed repeatedly by NVM interface 200, as illustrated by branch 202, thereby to receive multiple operations from processor 260. On receipt in act 201, NVM interface 200 stores each operation in a local memory therein ("operation memory"). Each NVM operation received by NVM interface 200 identifies a single NVM 253I uniquely, from within a group 253 that is coupled to NVM interface 200 by NVM bus 221.

In many aspects of the invention, each NVM operation that is received in act 201 is already subdivided (or segmented) in a predetermined manner into multiple phases that are separated by a period of waiting for an NVM to internally complete its execution of each phase, wherein each phase includes at least a transmission from NVM interface 200 to the uniquely identified NVM 253I, followed by a response from the NVM 253I transmitted back to the NVM interface 200. One illustrative NVM operation 231 is shown in FIG. 2B as including two phases 231A and 231C. As shown in FIG. 2B, the first phase 231A in the multi-phase NVM operation 231, includes a first transmission from NVM interface 200 to NVM 253I (for example of a command, followed by address and optional data, followed by another command). Such a first phase 231A in operation 231 is followed by a waiting period (identified as period 231B in FIG. 2B). As soon as the waiting period begins, operation 231 may be swapped out of execution by NVM interface 200 in accordance with the invention, if performance of another command 233 (see FIG. 2C) can be initiated during the waiting period. On completion of command 233 (or a phase therein) and when the waiting period ends, the second phase 231C is performed (also by transmitting information between NVM interface 200 and NVM 253I).

At the end of each transmission to NVM 253I, NVM interface 200 of one illustrative embodiment waits for a busyness signal from the NVM 253I and thereafter swaps out the NVM operation 231 currently being executed. In this manner, an initial phase 231A of each NVM operation 231 includes at least one transmission of a command to a specific NVM 253I, followed by either transmission or receipt of data to/from that specific NVM 253I, followed by receipt of the busyness signal, thereby to complete one phase. After an initial phase completes, NVM interface 200 must wait until that specific NVM 253I to complete its internal execution, as indicated by a readiness signal. In some embodiments, NVMs 253A-253N operate as slaves to NVM interface 200, and hence NVM interface 200 can wait for any length of time to communicate with an NVM 253I after that NVM 253I indicates completion of its internal execution of a phase.

Completion of internal execution of a phase in NVM 253I may be notified asynchronously to NVM interface 200 by a readiness signal from NVM 253I on a dedicated line (which is not shared with any other NVM) in some embodiments. In alternative embodiments NVM interface 200 itself reads this signal from a readiness register in NVM 235I by using NVM bus 221. In a first example of a second phase 231C, a command from NVM interface 200 is transmitted followed by either transmission and/or receipt of data to/from NVM 253I. In a second example of a second phase, NVM interface 200 simply receives data from NVM 253I (without sending another command to be internally executed by NVM 253I). In the just-described second example, NVM interface 200 sends a control signal to NVM 253I to retrieve data from NVM 253I. The control signal can be notified by different techniques depending on the embodiment, e.g. by driving the control signal to an active level (which can be one of either high or low), or by toggling a level of the control signal up and down at a predetermined rate.

In one illustrative example, an NVM operation 231 is to read data from a specific NVM 253I, and therefore initially starting at time T0 (see FIG. 2C), NVM interface 200 transmits on NVM bus 221 the following signals: a command 0x00, followed by an address, followed by another command 0x30. NVM interface 200 then waits for a ready signal from NVM 253I which is received at time T1 and therefore initial phase 231C completes at time T1. As NVM operation 231 is subdivided into two phases 231A and 231C (FIG. 2C), phase 231C can be performed at any time after NVM 253I completes execution of its commands in phase 231A. Accordingly, NVM interface 200 swaps out execution of current NVM operation 231 at time T1, and starts performing another NVM operation 233 (i.e. uses bus 221 to communicate with another NVM 253J).

After time T1 and before time T2 (see FIG. 2C), a single bus 221 is being used to perform two operations simultaneously, namely operation 231 is being performed in NVM 253I while operation 233 is being performed in NVM 253J. The just-described overlapping use of bus 221 to perform two operations 231 and 233 creates an appearance of two channels ("virtual channels"), namely CHANNEL 0 to/from NVM 253I and CHANNEL 1 to/from NVM 253J, both channels being in use between times T1 to T2 (FIG. 2C), although there exists only one physical bus 221. In this manner, virtual channel support can be provided by a non-volatile memory controller in accordance with this invention, for any number of channels (to/from corresponding number of NVMs) over a single physical bus 221, specifically by time interleaving of bus 221 among the multiple channels.

In some embodiments, while operation 233 is still being performed between times T1 and T2, if the internal execution of all commands of phase 231A in NVM 253I is completed, then nothing is done by NVM interface 200 to NVM 253I by use of bus 221, until a current phase of NVM operation 233 completes, which is then followed by swapping of NVM operation 231 into execution, to perform its final phase 231C using bus 221. Accordingly, the amount of time T2−T1 which separates phases 231A and 231C of operation 231C depends on the amount of time required to perform a phase of operation 233, which in turn can be greater than a period of waiting for NVM 253I to internally complete its execution of phase 231A. Hence, latency of channel 0 is increased in several embodiments of the invention when bus 221 is not immediately available on completion of a phase of a current operation in channel 0 (e.g. if bus 221 is being used to support another channel).

Figure 2C:
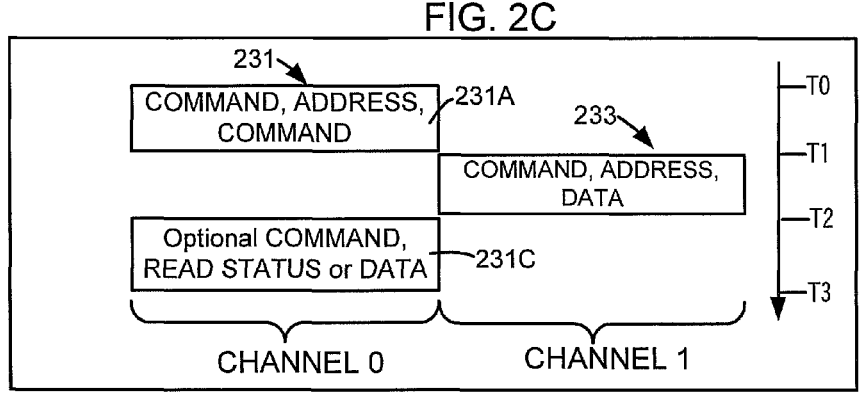
FIG. 2C illustrates virtualization of a shared bus by initiating performance of an operation 233 by one non-volatile memory (via one virtual channel), during a period of waiting for completion of phase 231A (of operation 231) by another non-volatile memory (via another virtual channel), in accordance with the invention.

If a phase (or the entirety) of operation 233 in CHANNEL 1 completes prior to the just-described period of waiting, then nothing is done to NVM 253I until NVM 253I internally completes its execution of phase 231A. In several embodiments, a waiting period between two phases 231A and 231C is predetermined and therefore NVM interface 200 is designed (or programmed) to only perform another operation 233 (or a phase therein) that is of a shorter duration than the waiting period, in order to reduce latency of CHANNEL 0. Referring to FIG. 2C, duration T2–T1 is the maximum of δT233 and δT231B, wherein δT233 is the amount of time required for operation 233 to complete and δT231B is the period of waiting for NVM 253I to internally complete its execution of phase 231A.

In some aspects, an NVM operation 232 (FIG. 2B) to write to multiple planes is segmented ahead of time into three phases, namely a first phase 232A to initiate writing of data by the NVM interface 200 to a first plane of a multi-plane NVM 253I, followed by a second phase 232C in which address and additional data to be written to another plane of the multi-plane NVM (with an optional command), followed by a third phase 232E to read status and confirm successful completion of writing by the multi-plane NVM. Note that the NVM operation's execution is suspended (by swapping out) on completion of each of the just-described phases 232A and 232C, except for the last phase 232E (after which the execution ends). Although a two-phase operation 231 and a three-phase operation 232 have been illustrated in FIG. 2B, it is readily apparent that a specific manner in which an NVM operation is segmented can be different, depending on the type of NVM operation, and depending on the design of the NVM itself.

Moreover, not all NVM operations are segmented into phases because an NVM operation may be performed by NVM interface 200 in a single phase, i.e. unsegmented. For example, an operation 233 (FIG. 2B) to read an identifier of NVM 253I (such as the manufacturer and the page size, and the timing), is performed in only one phase in some embodiments. Specifically, after transmission of a command and address, the just-described operation 233 includes waiting for readiness of NVM 253I optionally followed by reading of data, all of which are done without swapping out of operation 233 (due to this operation 233 being unsegmented).

Referring to FIG. 2A, after receipt of an NVM operation 231 (FIG. 2B) in act 201 (FIG. 2A), NVM interface 200 performs an act 212. In act 212, NVM interface 200 selects a phase of any operation that is currently awaiting performance, on any one of NVMs 253A-253N that is known to be now ready, in group 253. A signal indicating readiness of each NVM 253I is received by NVM interface 200 asynchronously in an act 203 (FIG. 2A). This act 203 is repeated multiple times, as shown by branch 204. In addition to readiness, NVM interface 200 selects a phase to be performed next in act 212 based on other factors, such as a priority that may be predetermined for each phase and/or a predetermined duration for which NVM bus 221 is to be used by a phase. Examples of priority are illustrated in Appendix C below, and such a priority assignment may be determined by trial and error for each NVM, depending on the embodiment.

In some aspects, a phase which is to use the bi-directional NVM bus 221 for the least amount of time is automatically selected by NVM interface 200, from among all phases that are ready to be performed. The amount of time ("duration") for which each phase uses the bi-directional bus 221 is pre-programmed into NVM interface 200 (e.g. hardwired therein) in some implementations, while in certain implementations this duration is specified at run time, e.g. within each NVM operation and for each phase J therein.

In several aspects of the invention, a phase (and therefore its NVM) is selected by the NVM interface 200 based on a comparison of a priority associated with each phase that is ready for performance, relative to priorities of other phases ready for performance in the NVM interface 200. For example, in some embodiments, a multi-page write operation 234 (FIG. 2D) has an initial command phase 234A of a low priority followed by multiple data phases 234C, 234E, 234G ... of high priority. In this example, the same operation 234 being a multi-page read has an initial command phase 234A of high priority followed by multiple data phases 234C, 234E, 234G ... of low priority. Depending on the aspect, the priority of each phase J in an NVM operation can be either predetermined or dynamically specified e.g. within each NVM operation received by NVM interface 200. See Appendix C for an illustration of priorities that are assigned to various phases of various operations, in one example. When a high priority phase is ready for performance, that phase is selected first. If multiple phases of the same priority (e.g. two or more high priority) are ready then a round-robin scheme is used to select among them.

A phase identified in act 212 is subsequently performed by NVM interface 200, as per act 213, by use of shared bi-directional NVM bus 221 (coupled to pins 220 of NVM interface 200 as shown in FIG. 2A) to transfer data to or from NVM 253I corresponding to the identified phase. After starting the performance of PHASE 1, depending on the type of operation (e.g. read or write), NVM 253I on which PHASE 1 is being performed in act 213 becomes busy internally in certain aspects of the invention, and its readiness signal becomes inactive (thereby to signal business) and in response NVM interface 200 transitions (as per branch 228) to an act 214 discussed in the next paragraph. However, in other operations, NVM 253I completes the current phase (and also the current operation, e.g. in case of operation 233 illustrated in FIG. 2B) without going busy, and in such operations NVM interface 200 goes from act 213 to act 218 without any suspension (as per branch 229).

In the certain operations, NVM 253I becomes busy internally as noted above when it receives an initial phase of an operation ("first operation") per act 213 (FIG. 2A), and therefore bus 221 is not used by NVM 253I (while busy). Hence, to improve utilization of bus 221, NVM interface 200 does not simply wait in act 213 for NVM 253I to become ready, and instead goes to act 214 where it suspends its own (i.e. NVM interface's own) performance of the operation (i.e. first operation), e.g. by storing state information in a local memory for later use in resuming the operation. After suspending the first operation, NVM interface 200 returns to act 212 (as per branch 215) and selects a phase of a second operation to perform on another NVM, to increase utilization of the shared bi-directional NVM bus 221.

Depending on the aspect, an NVM that is selected in act 212 by NVM interface 200 can be any one of multiple NVMs in its corresponding group which are coupled to the shared bi-directional NVM bus 221, as long as the NVM selected is not busy. Specifically, the second operation which is selected in act 212 can be an initial phase of a new operation that has yet to be started (assuming a corresponding NVM 253A is ready) in which case NVM interface 200 goes to act 213 (described above). Alternatively, in performing act 212 NVM interface 200 may select as the second operation a phase of any operation that was previously started and is currently suspended if the corresponding NVM (e.g. NVM 253J) is ready, in which case NVM interface 200 goes to act 216. In act 216 (FIG. 2A) NVM interface 200 retrieves state information (from local memory wherein state was stored in act 214), and thereafter initiates performance of the selected phase (FIG. 2B) on NVM 253J using shared bi-directional NVM bus 221 (via pins 220).

Therefore, while NVM 253I is performing PHASE 1 of a first operation initiated in act 213, NVM interface 200 uses the shared bi-directional NVM bus 221 (via the same set of bidirectional input-output pins 220) to communicate with another NVM 253J in act 216 to initiate performance of a PHASE J of a second operation. Hence, both NVMs 253I and 253J are made busy in performing two phases of their respective operations by NVM interface 200 using the same NVM bus 221. Although phase-level interleaving of two phases of two NVM operations by two NVMs has been described, NVM interface 200 can use the shared bi-directional NVM bus 221 to initiate internal performance of any phases of any operations (e.g. read, write, erase, reset, etc) in any number of NVMs within its corresponding group that are not busy internally and for which an operation awaits performance (either partially or wholly).

Figure 2D:
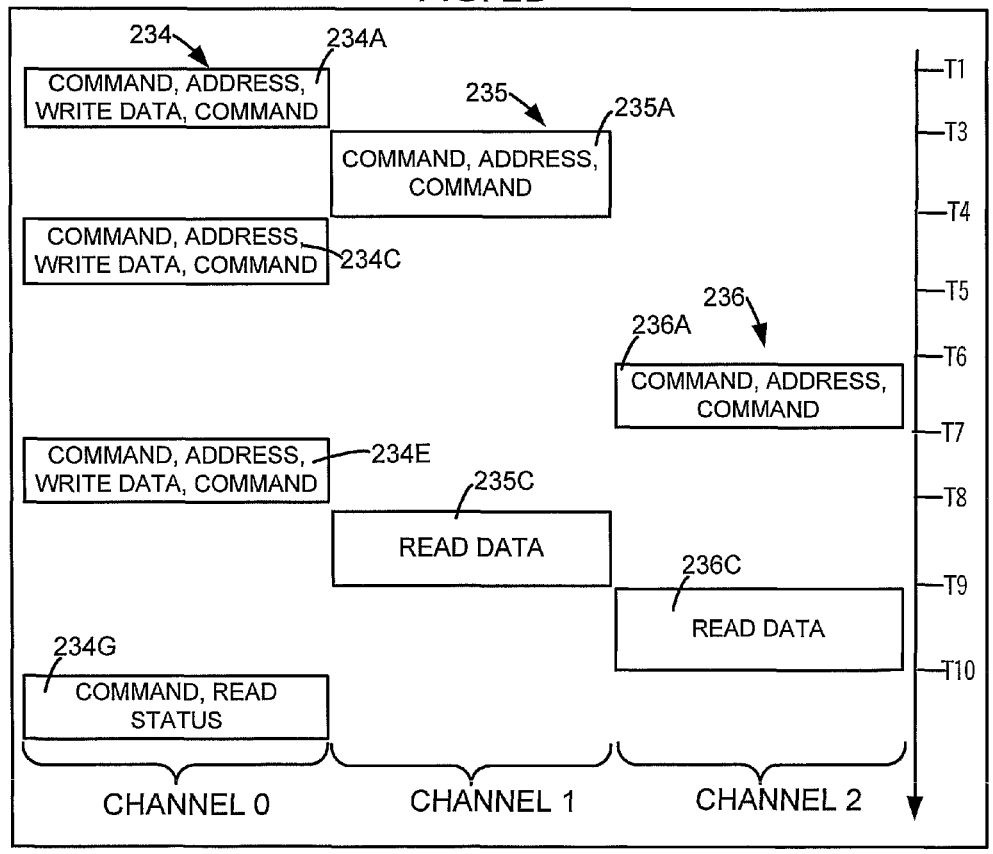
FIG. 2D illustrates initiation of performance of two operations 235 and 236 on a shared bus, during multiple periods of waiting for completion of various phases of operations 234 and 235 by respective non-volatile memories, thereby to create three virtual channels on a single shared bus in accordance with the invention.
Figure 2E:
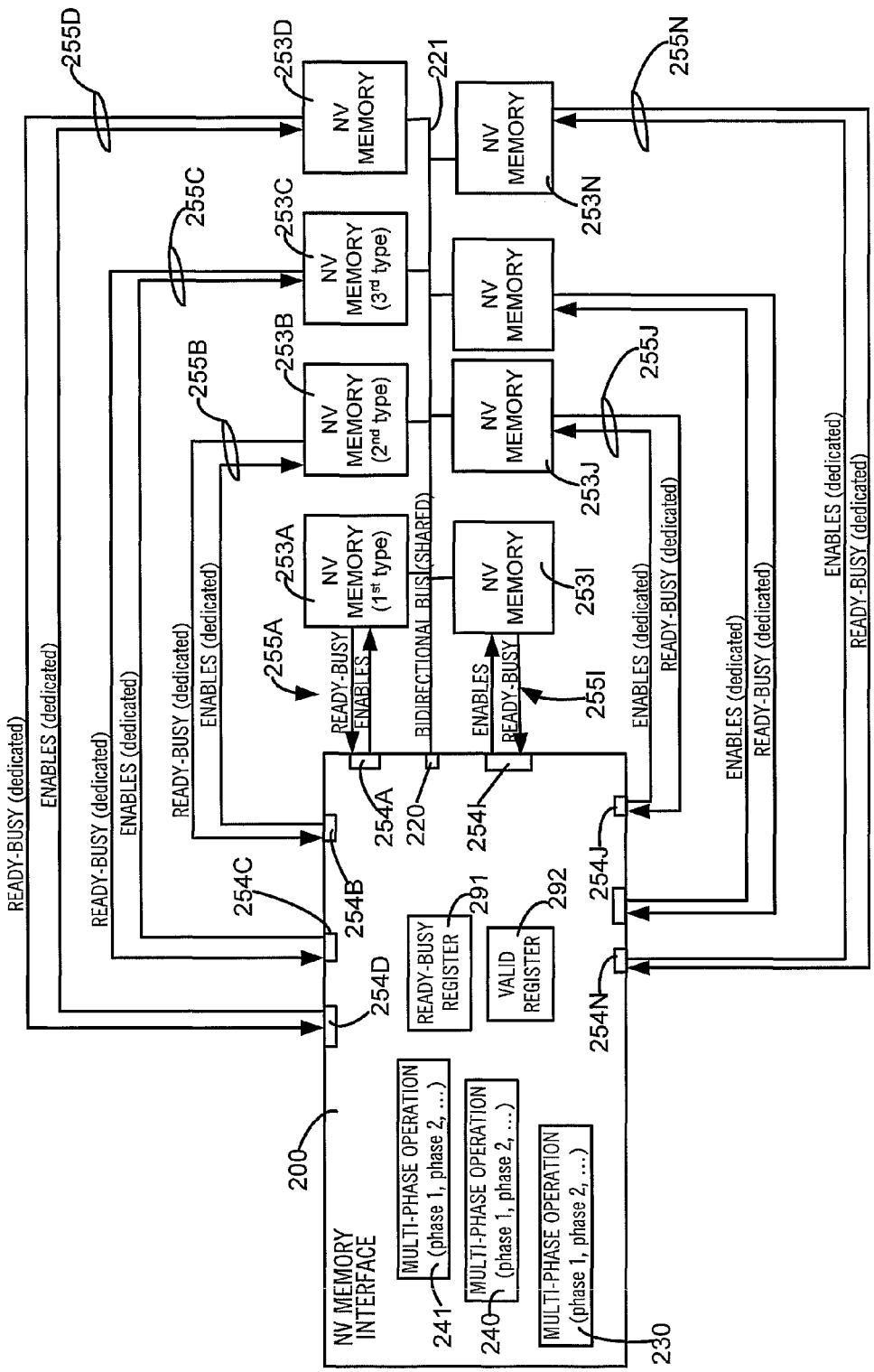
FIG. 2E illustrates, in a high-level block diagram, ports of non-volatile memory interface 200 that are coupled to NVM memories 253A-253N of FIG. 2A in two ways: (1) a single shared port including pins 220 for bi-directional data transfer to all NVM memories 253A-253N, and (2) multiple dedicated ports 254A-254N of pins used to receive readiness signals and transmit enable signals in a dedicated manner with corresponding NVM memories 253A-253N respectively.

Accordingly, while NVMs 253I and 253J are both busy internally, NVM interface 200 may use the shared bi-directional NVM bus 221 to transmit yet another phase of another operation to any other NVM 253N in the group 253, depending on its readiness. Alternatively, if at this stage another NVM 253A has finished performance of a phase, then NVM interface 200 may use shared bi-directional NVM bus 221 to further communicate with NVM 253A, e.g. to perform another phase. For example, FIG. 2D illustrates interleaved performance of three operations 234, 235 and 236, wherein an initial phase 235A of operation 235 is initiated between initiation of initial phase 234A and before initiation of intermediate phase 234C of operation 234. In this example, performance of another operation 236 is interleaved between operations 234 and 235 by initiating its initial phase 236A after initiation of phases 235A and 234C of operations 235 and 234, before initiating their respectively following phases 235C and and 234E.

Referring to FIG. 2A, at the end of act 216, if an NVM operation completes, then NVM interface 200 goes to act 218. Act 218 is normally performed by NVM interface 200 when all phases of a current operation have been completed, at which time, NVM interface 200 resets a flag (e.g. a bit in a valid register within NVM interface 200) and activates a signal, e.g. drives an interrupt to processor 260, indicating the operation that had been previously supplied to NVM interface 200 has now been completed. After act 218, NVM interface 200 returns to act 212 (via branch 219).

Segmentation of an NVM operation into multiple phases as illustrated in FIG. 2B, and interleaving the performance of phases creates virtual channels which in turn increase utilization of a shared bi-directional NVM bus 221 to a level never previously possible in any prior art known to inventors. Specifically, the above-described NVM interface 200 receives multiple operations to perform data transfers over shared bi-directional NVM bus 221 to and from NVMs 253A-253N.

NVM interface 200 initiates performance of the received operations in an overlapped and concurrent manner relative to one another, by time-shared use of bi-directional NVM bus 221 between various phases of each operation. Use of phases enables NVM interface 200 to interleave usage of shared bi-directional NVM bus 221 therebetween, instead of NVM interface 200 working uninterrupted on a single unsegmented NVM operation until its completion. In this manner, NVM interface 200 implements multiple virtual channels (e.g. eight channels) over the shared bi-directional NVM bus 221, to multiple NVMs 253A-253N (e.g. eight NVMs) in group 253.

As noted above, a status signal is received by NVM interface 200 from each NVM 253I in group 253, either independently in a manner similar to an interrupt, i.e. asynchronously, or in alternative aspects as a response to a poll. In some aspects of the invention, the just-described status signal is received on a pin of the NVM interface that is uniquely dedicated and coupled to a corresponding NVM (and in these aspects, N pins on the NVM interface are individually coupled to N corresponding NVMs as discussed below). In certain aspects of the invention, such status signals are all received on the shared bi-directional NVM bus 221 that couples the NVM interface 200 to group 253, e.g. in response to individually polling each NVM 253I.

As noted above, in some aspects of the invention, an NVM interface 200 is coupled to each NVM 253I in group 253 in a dedicated manner in addition to a shared coupling via bi-directional NVM bus 221 e.g. by use of ports 254A-254N of pins as illustrated in FIG. 2C. The pins in each port 254I are connected in a dedicated manner (forming a one-to-one correspondence) to a respective NVM 253I and to no other NVM, and for this reason ports 254A-254N are also referred to herein as "dedicated" ports, and buses 255A-255N are also referred to herein as "dedicated" buses.

In several aspects of the invention, each dedicated set 253I of pins in NVM interface 200 includes at least one input pin that carries a ready-busy signal indicating readiness or busyness of the NVM 253I connected thereto, and at least one output pin that carries an enable signal to the NVM 253I, e.g. to indicate chip enable thereto. Moreover, certain implementations of NVM interface 200 include a register ("ready-busy" register) 291 that latches a current signal on each ready-busy pin of NVM interface 200, e.g. from each of dedicated ports 254A-254N. Accordingly, NVM interface 200 in many aspects of the invention checks register 291 in act 212 to find out the readiness of an NVM 253I, prior to performing act 213 to initiate an operation therein using shared bi-directional NVM bus 221.

In addition to the above-described chip enable signal, NVM interface 200 generates and transmits other control signals to each NVM 253I, e.g. on individual lines in the shared bi-directional NVM bus 221. Accordingly, in many aspects of the invention, input-output pins 220 include a command latch enable (CLE) pin, an address latch enable (ALE) pin, a write enable (#WE) pin, and a read enable (#RE) pin, in addition to I/O pins that carry words of data or address or command.

Note that NVMs 253A-253N which are coupled to NVM interface 200 as illustrated in FIG. 2C may or may not all be of the same type, depending on the aspect of the invention. For example in some embodiments, NVMs 253A-253N are of different types, e.g. differ in size and/or differ in speed, and/or differ in logic gates such as NAND gates or NOR gates or some combination thereof. As another example, in certain embodiments, each of NVMs 253A-253N is from a different vendor and manufacturer.

In some aspects of the invention, for each received NVM operation, in act 201 (FIG. 2A) NVM interface 200 sets a bit in a register ("valid" register) 292 active, e.g. sets the value to high (e.g. value 1). In these aspects, the just-described bit (also called "valid bit") when high indicates that the NVM operation is not yet complete and after the operation is completed this valid bit (also called "flag" in the above description, and in FIG. 2A) is reset by NVM interface 200 (e.g. in act 218). However, alternative aspects of NVM interface 200 do not use a valid bit as just described, e.g. the alternative aspects may use a nibble to indicate one of 16 states of the operation. On completion of the NVM operation in act 218 (FIG. 2A), NVM interface 200 sets the validity bit inactive and interrupts processor.

In some aspects of the invention, NVM interface 200 uses valid register 292 and ready-busy register 291 as follows. Specifically, in act 212, the NVM interface 200 matches individual bits indicating readiness signals in ready-busy register 291 with corresponding bits indicating validity of operations in valid register 292. From among those operations which are valid and whose NVM is ready, NVM interface 200 of some embodiments prioritizes resumption of suspended operations ahead of yet-to-be-started ("new") operations. In certain aspects of the invention, NVM interface 200 is responsive to two priority levels, namely a high priority and a low priority either of which may be assigned to each phase of an NVM operation. In the just-described certain aspects, NVM interface 200 prioritizes resumption of high-priority phases ahead of low-priority phases, regardless of whether an operation is new or suspended. However, if the initial phases of new operations and the next phases of suspended operations have the same priority (e.g. all high priority), then NVM interface 200 of the just-described certain aspects selects a phase (and hence its NVM) on a round-robin basis. To summarize, act 212 is implemented by NVM interface 200 to perform multitasking among multiple operations by interleaving of individual phases therein when using a shared bi-directional NVM bus 221.

Operation of NVM interface 200 in one illustrative example in accordance with the invention is further shown in FIGS. 3A and 3B, as per the following sequence of events. Specifically, prior to time period ΔT1 (FIG. 3A) NVM interface 200 started an operation C to transfer data to/from NVM 253C, and this operation C has been suspended, while in the interim new operations A and B have been received. At this stage, both NVM 253A and NVM 253B have their readiness signals active on the respective lines RB1# and RB2# that are connected to the respective pins 254A and 254B of NVM interface 200 (FIG. 2C). The validity and readiness signals at the beginning of time T1 are as follows for the three flash memories.

|  | NVM 253A | NVM 253B | NVM 253C |
| --- | --- | --- | --- |
| VALIDITY BIT | ACTIVE | ACTIVE | ACTIVE |
| READINESS SIGNAL | ACTIVE | ACTIVE | INACTIVE |

During time period ΔT1 (FIG. 3A) NVM interface 200 starts a read operation A by driving the chip enable CE1# active on shared bi-directional NVM bus 221 to NVM 253A. At the end of time period ΔT1 (FIG. 3A), NVM 253A becomes internally busy (in retrieving the requested data) and the shared bi-directional NVM bus 221 becomes idle. Hence, at the end of time period ΔT1, NVM 253A drives the readiness signal on line R/B1# inactive (e.g. low) as shown in FIG. 3A. At this stage, NVM interface 200 internally stores the current state of read operation A, and switches to performing a new write operation B during time period ΔT2 (FIG. 3A). The validity and readiness signals at the beginning of time period ΔT2 (FIG. 3A) are as follows for the three flash memories.

|  | NVM 253A | NVM 253B | NVM 253C |
| --- | --- | --- | --- |
| VALIDITY BIT | ACTIVE | ACTIVE | ACTIVE |
| READINESS SIGNAL | INACTIVE | ACTIVE | INACTIVE |

During time period ΔT2 (FIG. 3A), NVM interface 200 uses shared bi-directional NVM bus 221 in a manner similar to time period ΔT1, except that NVM 253B is used. At the end of time period ΔT2, after the data to be written has been transferred to NVM 253B, NVM 253B becomes internally busy (in storing the received data) and shared bi-directional NVM bus 221 again becomes idle. Hence, at the end of time period ΔT2, NVM 253B drives the readiness signal on line R/B2# inactive (e.g. low). At this stage, NVM interface 200 internally stores the current state of write operation B. The validity and readiness signals at the beginning of time period ΔT3 (FIG. 3B) are as follows for the three flash memories.

|  | NVM 253A | NVM 253B | NVM 253C |
| --- | --- | --- | --- |
| VALIDITY BIT | ACTIVE | ACTIVE | ACTIVE |
| READINESS SIGNAL | INACTIVE | INACTIVE | ACTIVE |

During time period ΔT3 (FIG. 4B) controller block switches to resumption of a suspended operation C. Note that at the end of time period ΔT2, both flash memories 221 and 222 are internally busy and cannot use NVM bus 221 to transfer any data. During time period ΔT3 (FIG. 3B), NVM interface 200 uses shared bi-directional NVM bus 221 in a manner similar to time periods ΔT1 and ΔT2 (FIG. 3A), except that still another NVM 253C is used. At the end of time period ΔT3, operation C is complete and NVM interface 200 interrupts processor. The validity and readiness signals at the beginning of time period ΔT4 are as follows for the three flash memories.

|  | NVM 253A | NVM 253B | NVM 253C |
| --- | --- | --- | --- |
| VALIDITY BIT | ACTIVE | ACTIVE | INACTIVE |
| READINESS SIGNAL | ACTIVE | INACTIVE | ACTIVE |

Hence, at the beginning of time period ΔT4 (FIG. 3B), NVM interface 200 switches to resuming the performance of read operation A, and shared bi-directional NVM bus 221 is used to transfer the requested data from NVM 253A to NVM interface 200. At the end of time period ΔT4 (FIG. 3B), operation A is also complete and NVM interface 200 interrupts processor. The validity and readiness signals at the beginning of time period ΔT5 (FIG. 3B) are as follows for the three flash memories.

|  | NVM 253A | NVM 253B | NVM 253C |
|---|---|---|---|
| VALIDITY BIT | INACTIVE | ACTIVE | INACTIVE |
| READINESS SIGNAL | ACTIVE | ACTIVE | ACTIVE |

Thereafter, at the beginning of time period ΔT5 (FIG. 3B), NVM interface 200 switches to resuming the performance of write operation B. Specifically, during time period ΔT5, shared bi-directional NVM bus 221 is used by NVM interface 200 to finish up the operation in NVM 253B, e.g. to read status as discussed below. At the end of time period ΔT5, operation B is also complete and NVM interface 200 interrupts processor. The validity and readiness signals at the end of time period ΔT5 are as follows for the three flash memories.

|  | NVM 253A | NVM 253B | NVM 253C |
|---|---|---|---|
| VALIDITY BIT | INACTIVE | INACTIVE | INACTIVE |
| READINESS SIGNAL | ACTIVE | ACTIVE | ACTIVE |

For illustrative purposes, operation C's 1st phase (before NVM 253C became busy) is not shown in FIG. 3A, and the command therein could be either read or write. A read status is performed after each write operation, to check whether the write operation was successful. But note that a read status also can be an operation all by itself, in which case the corresponding operation is performed by NVM interface 200 from start to finish without suspension (see the above description of branch 229).

Figure 4A:
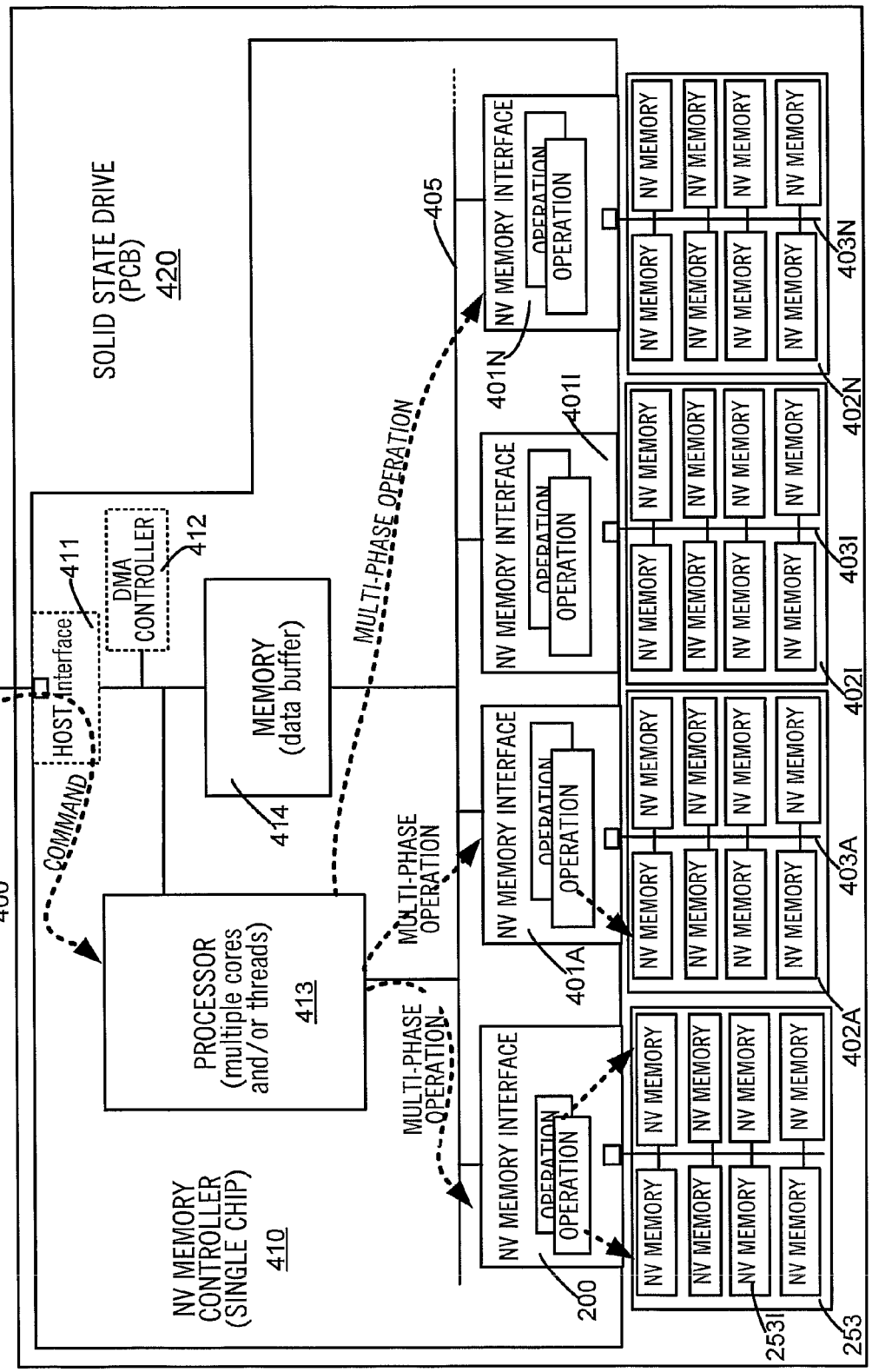
FIG. 4A illustrates, in a high-level block diagram, a NVM controller 410 that includes multiple NVM interfaces 431A-431M of the type illustrated in FIGS. 2A-2E, as well a processor 413 and a memory 414, in some aspects of the invention.

NVM interface 200 described above is included in some implementations within a single chip NV memory controller 410 illustrated in FIG. 4A. The single chip NV memory controller 410 is itself mounted on a printed circuit board 420 (also called "solid state drive") on which are also mounted multiple NVMs, such as group 253 described above that is connected by NVM bus 221 to NVM interface 200 within NV memory controller 410. In addition to NVM interface 200, NV memory controller 410 may include any number of additional NVM interfaces 401A-401N that are respectively coupled to their own groups 402A-402N of NVMs, by respective bi-directional buses 403A-403N. NVM interface 200 and additional NVM interfaces 401A-401N are coupled by a bus 405 within NV memory controller 410 to a memory 414 therein. Memory 414 buffers locally (i.e. within NV memory controller 410) the data that is being transferred between all NVMs 253A-253N and a host 400 to which NV memory controller 410 is coupled, and hence bus 405 is also referred to herein as a "local bus." Additionally, in some embodiments, local bus 405 also couples a processor 413 (included within NV memory controller 410), to each of multiple NVM interfaces 200 and 401A-401N.

Processor 413 supplies multi-phase operations to each of NVM interfaces 200 and 401A-401N, to be performed by NVMs respectively coupled thereto. Depending on the aspect of the invention, processor 413 may be implemented with a single core executing a single thread, or a single core with multiple threads or even with multiple cores. In one illustrative embodiment, two separate cores are used in processor 413, wherein one core interfaces with host 400 (and hence called the "host management core"), wherein another core segments operations into phases and transmits the operations to NVM interfaces 200 and 401A-401N and the two cores communicate with one another through a shared memory included in processor 413.

In response to multi-phase operations from processor 413, each of NVM interfaces 200 and 401A-401N assumes responsibility for performance of the received multi-phase operations. As noted above, each of NVM interfaces 200 and 401A-401N receives multiple operations that are to be performed by NVMs in corresponding groups 453 and 402A-402N, and selects individual phases therein for performance based on the readiness or busyness of the respective NVM and optionally based on a priority and/or expected duration of bus usage of the phase.

In many aspects of the invention, NVM interfaces 200 and 401A-401N are implemented in hardware, so as to maximize performance of NV memory controller 410. In one illustrative embodiment, an NVM interface 200 is implemented by a programmable state machine and a hardware scheduler that round-robins through all NVMs that are coupled to NVM interface 200 to identify an NVM whose phase is to be performed next. The scheduler is implemented in hardware so that it can respond to a change in readiness of an NVM, and schedule a next NVM more quickly and efficiently than software.

In some embodiments of the type illustrated in FIG. 4A, NVM interfaces 200 and 401A-401N are implemented to maximize performance, e.g. using a hardware scheduler to start a to-be-performed phase quickly on another NVM die/chip in response to the current NVM die/chip goes busy (e.g. after saving the current state). One illustrative implementation has each NVM interface supporting 8 NVM dies/chips, but certainly not limited to that number. The just-described illustrative implementation has 8 such NVM interfaces working with one processor 413, though not limited to that number either. Accordingly, in the just-described illustrative implementation, NV memory controller 410 has eight physical channels, and sixty-four virtual channels, thereby to enable a solid state drive 420 to use sixty-four dies of NVM.

Processor 413 is relieved of the responsibility of performance of the operations supplied to NVM interfaces 200 and 401A-401N, and thus processor 413 can support more schedulers and thus more channels, in high-level scheduling, wear-leveling, etc. The just described combination of NVM interfaces 200 and 401A-401N, and processor 413 results in a high utilization of the NVM bus 221 which may otherwise form a bottleneck. Such an implementation provides either higher performance, and/or lower cost, to the user of the solid state drive 420.

An operation (e.g. a multi-plane write operation) is segmented into multiple phases, based on time delays that are known to be inherent therein. For example, an amount of time is known to elapse between a first time TB when an NVM indicates it is busy in response to receipt of an initial phase of a read command or a write command, and a second time TR (following the first time TB) when the NVM becomes ready. When the difference therebetween, namely TB−TR is sufficiently large to swap to and initiate performance of another phase by another NVM, the operatio n is subdivided into phases, e.g. a first phase up to time TB and a second phase following time TR, so that NVM bus 221 is used by NVM interface 200 to perform another phase during at least a portion of the difference TB−TR (which would otherwise result in NVM bus 221 being unused). Hence, the following condition is used in some embodiment to segment an operation into phases: TB−TR>TS, wherein TS is the duration required by NVM interface to perform a swap of operations and as discussed above TB-TR is the time required by an NVM for internal execution of the first phase.

In one illustrative embodiment, a write operation is segmented by processor 413 into N phases, each phase being performed to write data to a single plane of an NVM 253I that has N planes. In the illustrative embodiment, an NVM operation has N portions of its data written to each of N phases at a unique address that is common to all N phases, i.e. the same address A is used in each of the N planes of the NVM 253I. The specific manner in which an NVM operation is segmented by processor 413 into multiple phases differs, depending on the operation and depending on the aspect of the invention. In some embodiments, segmentation of each operation is predetermined (e.g. hard coded) in the design of processor 413. Accordingly, segmentation of each NVM operation will be readily apparent to the skilled artisan in view of this disclosure.

In some aspects of the invention, NV memory controller 410 includes memory 414 (FIG. 4A) that is used to hold data that is transferred to/from an NVM by performance of an NVM operation. Memory 414 may be implemented in NV memory controller 410 for example, as on-chip SRAM or as off-chip DRAM mounted on PCB 420. For example, data that is read from an NVM 253I is transferred by NVM interface 200 via local bus 405 in NV memory controller 410 to memory 414. Similarly, data that is written to an NVM 253I is transferred by NVM interface 200 via a bus 405 from memory 414. Therefore, memory 414 is used as a data buffer in NV memory controller 410.

In certain aspects of the invention, NV memory controller 410 includes a host interface 411 (FIG. 4A) that is used to transfer information to and from an external host 400 such as a personal computer. Host 400 may use a DMA controller 412 (also included in NV memory controller 410) to transfer data to and from memory 414 of NV memory controller 410. For example, host 400 may issue a write command to processor 413 in NV memory controller 410 followed by transferring data to be written via DMA controller 412 to memory 414. In some illustrative embodiments, host 400 issues commands to NV memory controller 410 in conformance with an industry standard, such as AT Attachment 8-ATA/ATAPI Command Set (ATA8-ACS)—Working Draft Project American National Standard T13/1699-D, Revision 6a, Sep. 6, 2008 and/or ATA/ATAPI Command Set-2 (ACS-2) Working Draft Project American National Standard T13/2015-D, Revision 1a, Mar. 2, 2009 both of which are incorporated by reference herein in their entirety.

In the just-described illustrative embodiments, host interface 411 conforms to the just-described industry standard so as to accept commands from host 400. For example, host interface 411 may implement a Serial ATA (SATA) interface that accepts SATA commands in conformance with Native Command Queuing (NCQ) well known to an artisan skilled in the design of disk drives. Although certain specifications have been just described, any other predetermined commands may be used between host 400 and processor 413, depending on the embodiment.

Figure 4B:
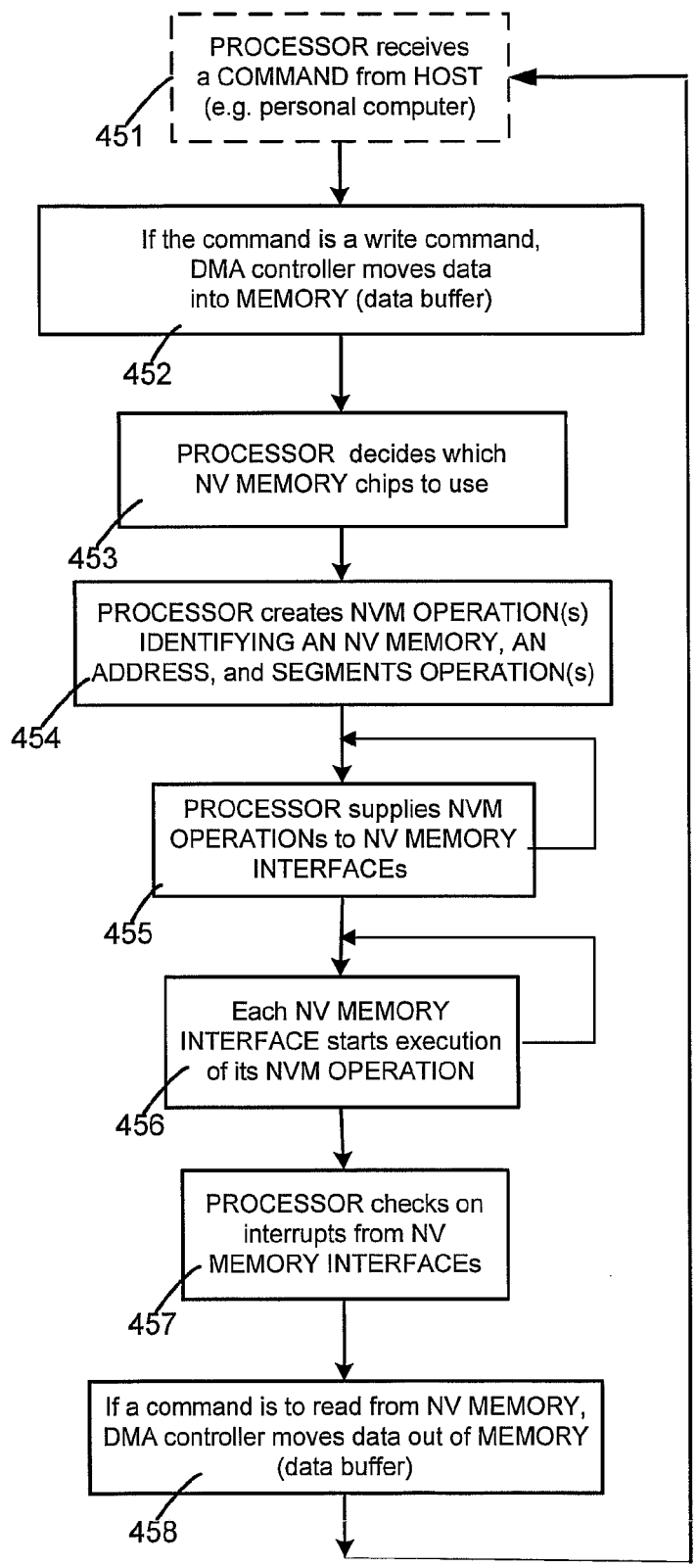
FIG. 4B illustrates, in a flow chart, a method performed by the processor 413 of FIG. 4A in one illustrative aspect of the invention.

Operation of NV memory controller 410 in some aspects of this invention is illustrated in FIG. 4B. Specifically, in an act 451, processor 413 receives a command from host 400 and stores the command locally therein. Next, in an act 452, if the command is a write command, DMA controller 412 transfers data from host 400 to memory 414. Next, in act 453, processor 413 decides which NVM is to be used, and a specific address therein, to perform the command received in act 451. For example, if data is to be read, processor 413 identifies NVMs which hold the requested data but if data is to be written, processor 413 identifies NVMs that have sufficient capacity to hold the data. In deciding which NVMs to use in act 453, processor 413 of some embodiments also performs traditional functions of the type normally performed in using flash chips, such as wear leveling.

Next, in act 454 (see FIG. 4B), based on a command received from host 400, processor 413 creates one or more NVM operations of the type discussed above, e.g. identifying an NVM on which each NVM operation is to be performed, as well as an address within the NVM at which the operation is to be performed. In act 454, each NVM operation that has a sufficiently large time delay between the NVM going busy and returning to ready is segmented by processor 413 into multiple phases, as noted above. Also, at this stage, if a command from host 400 requests data that is already present in memory 414, processor 413 does not create an NVM operation in act 454 and instead directly initiates transfer of the requested data to host 400.

Figure 4C:
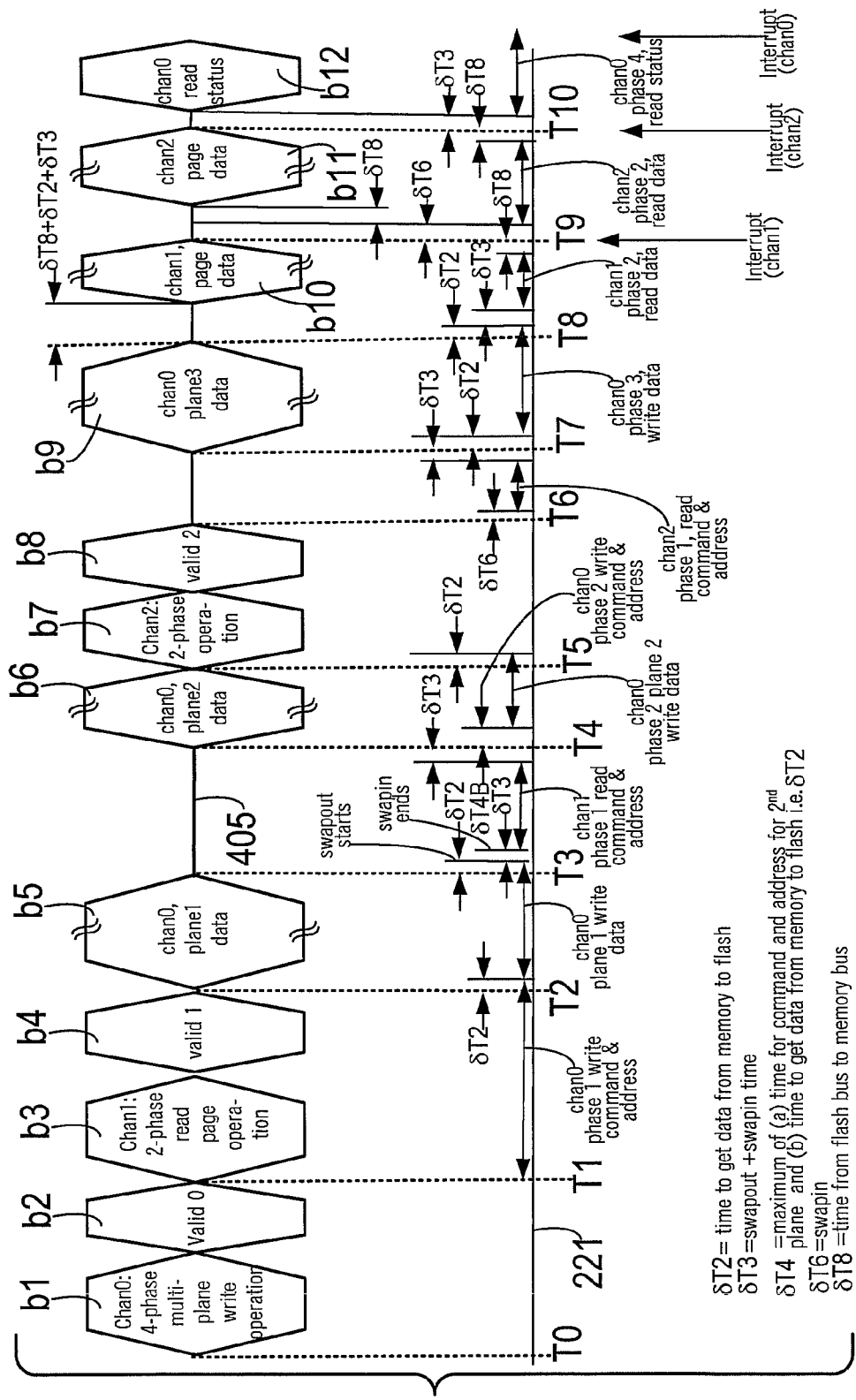
FIG. 4C illustrates, in a timing diagram (not to scale, and not linear), various signals on a bus 405 between processor 413 and NVM interfaces 200, 401A, 401I and 401N of FIG. 4A, and corresponding events on bus 221 to NVMs 253A-253N in accordance with the invention.

Subsequently, in act 455 (see FIG. 4B), processor 413 supplies NVM operation(s) that were created in act 454 to whichever NVM interfaces 200 and 253A-253N are coupled to the NVMs that were identified in act 454. For example, as illustrated in FIG. 4C, processor 413 transmits on local bus 405 a multi-plane four-phase write NVM operation for a virtual channel 0 to an NVM interface 200 (e.g. for 100 nanoseconds as shown by bubble b1 in FIG. 4C) followed by setting a valid bit (valid 0) in NVM interface 200 (e.g. for 10 nanoseconds as shown by bubble b2 in FIG. 4C) between times T0 and T1. At time T1, NVM interface 200 starts a DMA (direct memory access) operation on local bus 405, and also puts a command and address on NVM bus 221, as discussed next.

Specifically, between times T1 and T2, processor 413 transmits on local bus 405 a two-phase read NVM operation for another virtual channel 1 to the same NVM interface 200 (as illustrated by bubble b3 in FIG. 4C) followed by setting another valid bit (valid 1) in NVM interface 200 (as illustrated by bubble b4 in FIG. 4C). Therefore, between times T1 and T2, NVM interface 200 uses NVM bus 221 (as indicated in the lower half of FIG. 4C), to communicate with NVM 253A, by transmitting thereto a write command and address, so as to initiate internal execution of command(s) of a first phase of the multi-plane four-phase write NVM operation within NVM 253I. Referring to FIG. 4B, act 455 is performed by processor 413 multiple times, depending on the amount of storage available in each NVM interface, to hold the operations to be performed, e.g. 8 operations can be stored by some NVM interfaces of the type described herein.

In an act 456 (see FIG. 4B), each NVM interface 200 that receives an NVM operation starts execution of the received NVM operation, and interrupts processor 413 after completion of the operation. For example if NVM interface 200 received a 4-phase write NVM operation for virtual channel 0 as described in the previous paragraph in reference to FIG. 4C, data to be written to a first plane in NVM 253I, namely plane 1 is transferred via local bus 405 from memory 414, between times T2 and T3 (as illustrated by bubble b5 in FIG. 4C). Thereafter, local bus 405 is unused until time T4 at which time data to be written to a second plane, namely plane 2 is transferred via bus 405 from memory 414 (as illustrated by bubble b6). Meanwhile, a short time δT2 after time T2, NVM bus 221 is used by NVM interface 200 to transfer the data to be written to the first plane to NVM 253I (see bottom half of FIG. 4C), The time δT2 is the time required by NVM interface 200 (e.g. 50 nanoseconds at 100 MHz clock cycle) to move data from memory 414 to the data pins of bus 221 e.g. via DMA (direct memory access). Hence the DMA access time δT2 is relatively short (several times smaller, e.g. 10 times smaller) than time T2−T1 required to transfer data to NVM 253I.

Note that although local bus 405 is unused between times T3 and T4, NVM interface 200 maximizes usage of NVM bus 221, e.g. by transmitting thereon an instruction to another NVM 253A to initiate performance of a first phase of the above-described two-phase read command and corresponding address on channel 1. Specifically, at time δT2 after time T3, the memory access for channel 0 plane 1 data completes. Therefore, at time T3+δT2 NVM interface 200 begins to swap out the channel 0 operation, and swap in the channel 1 operation. The swap-out and swap-in together take a time δT3 and therefore the channel 1 operation begins execution at time T3+δT2+δT3. So, NVM bus 221 is used for a channel 1 operation from time T3+δT2+δT3 and this use ends at time T4−δT3, wherein as noted above δT3 is the time required for a swapout of the current operation followed by swapin of another operation.

Between times T4 and T5, NVM interface 200 uses local bus 405 to transfer data for the second plane (plane 2) of NVM 253I from memory 414, as shown by bubble b6 in FIG. 4C. Consequently, at time T4 the shared NVM bus 221 is used to transmit a write command and address for the second phase of the write operation in channel 0, and a short time δT4 later the just-described data is transmitted on NVM bus 221 to NVM 253I. Time δT4 is the greater of (1) time for transmitting the second phase's command and address to be used to write data in a second plane in NVM 253I and (2) the time to get data from memory to flash i.e. δT2. The transmission of the just-described data on NVM bus 221 ends at time T5+δT2, and subsequently NVM bus 221 remains unused in this example up to time T6+δT6 because there are no operations that have phases ready to be performed in NVM interface 200.

In this example, between times T5 and T6, processor 413 transmits on local bus 405 a two-phase NVM operation for another NVM 253N on another virtual channel 2 to the same NVM interface 200 (as illustrated by bubble b7 in FIG. 4C), followed by setting another valid bit (valid 2) in NVM interface 200 (as illustrated by bubble b8). Accordingly, at time T6, NVM interface 200 has three operations that are valid. Thereafter, between times T6 and T7, local bus 405 (which is coupled to memory 414) is idle. However, NVM bus 221 (which is coupled to the group 253 of NVMs) is used starting at a time δT6 after time T6, wherein δT6 is the time required to swapin an operation, in this case the just-described single-phase NVM operation. Specifically, between times T6+δT6 the NVM bus 221 is used to initiate performance of the NVM operation for channel 2 which ends at time T7−δT3.

Next, between times T7 and T8, data to be written to a third plane, i.e. plane 3 in NVM 253I is transferred via local bus 405 from memory 414 (as illustrated by bubble b9 in FIG. 4C). The same data is transferred on NVM bus 221 a short time later, starting at time T7+δT2. Transfer of this data on NVM bus 221 ends at time T8+δT2. Thereafter, starting at time T8+δT2+δT3, NVM bus 221 is used for channel 1, to retrieve data in a second phase of the two-phase read operation. Hence, simultaneously, at time T8+δT2+δT3+δT8, the data for channel 1 which has been retrieved from NVM 253A is transferred on local bus 405 to memory 414 (as illustrated by bubble b10), On completion of this data transfer at time T9, NVM interface 200 generates an interrupt to processor 413. Note that use of NVM bus 221 ends at a short time δT8 before T9, wherein δT8 is the amount of time required to transfer data from the NVM bus 221 to local bus 405. Specifically at time T9, processor 413 is interrupted by NVM interface 200, to indicate completion of the operation on channel 1. As the execution of channel 1 operation is now completed, at time T9+δT6 NVM interface 200 starts execution of phase 2 of the channel 2 operation. Hence, between times T9+δT6 and T10−δT8, bus 221 is used to transfer data from NVM 253N (in response to the second phase of the two-phase command on channel 2) and starting at time T9+δT6+δT8 this data is also transferred via local bus 405 to memory 414 (as illustrated by bubble b11) and on completion thereof another interrupt is generated to processor 413, at time T10.

In this example, the channel 0 operation is swapped in at time T10+δT6, and therefore bus 221 is to retrieve status data from NVM 253I, as required by a last phase of the 4-phase write operation. This data is also transferred on local bus 405 to memory 414 as shown in FIG. 4C by bubble b12 and thereafter another interrupt is generated for processor 413.

Referring to FIG. 4B, eventually, in act 457, processor 413 checks on interrupts from NVM interfaces 200 and 253A-253N. For example, after time T10 (FIG. 4C), processor 413 communicates with NVM interface 200 to retrieve status of the write operation on channel 0. Thereafter, in act 458 (FIG. 4B), if a command from host 400 was to read data, then DMA controller 412 moves data from memory 414 via host interface 411 to host 400. The just-described process may be repeated, e.g. by NV memory controller 410 returning from act 458 back to act 451.

Figure 5A:
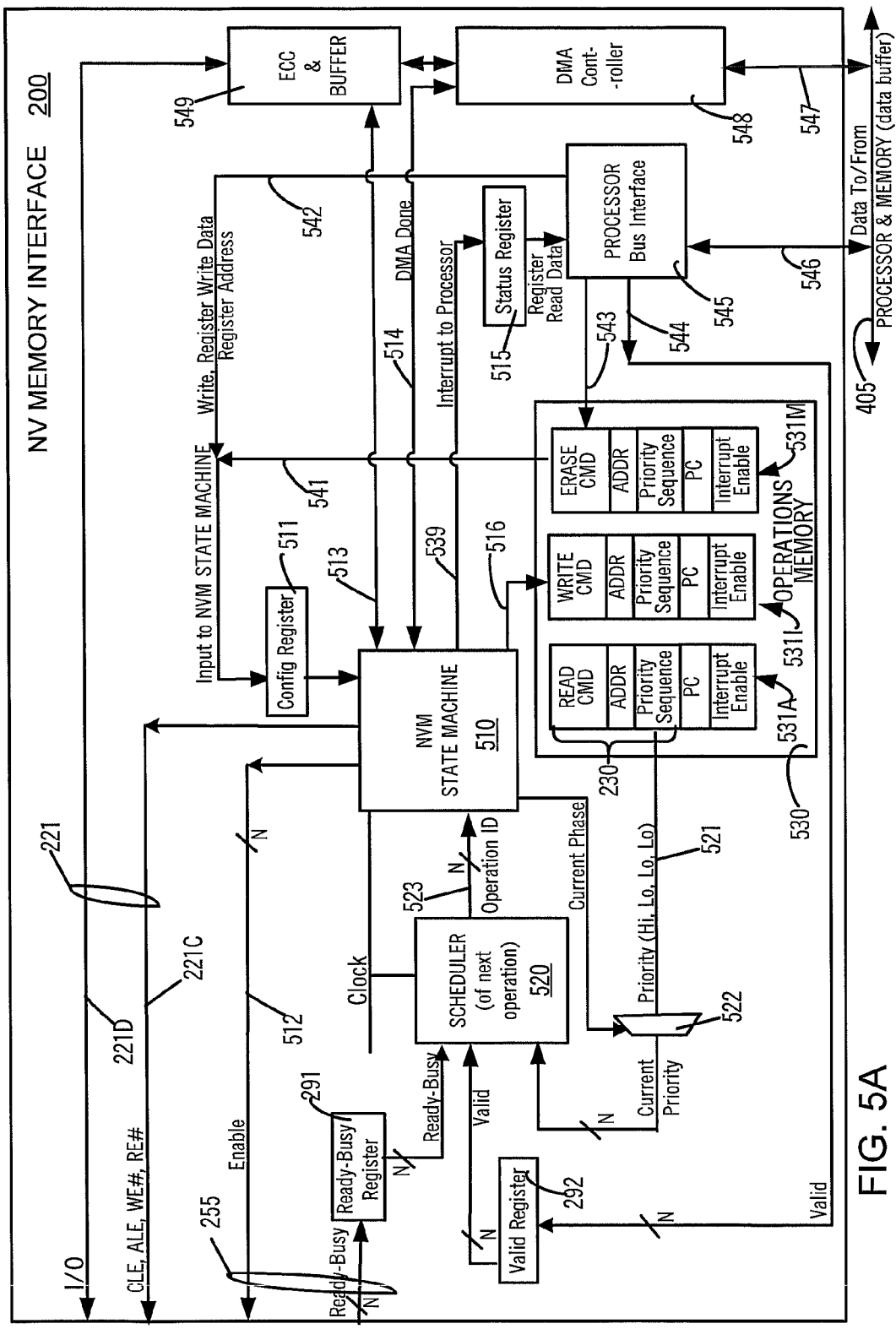
FIG. 5A illustrates, in an intermediate level block diagram, an example of circuitry used to implement a non-volatile memory interface 200 of the type illustrated in FIGS. 2A-2C, in some aspects of the invention.
Figure 5B:
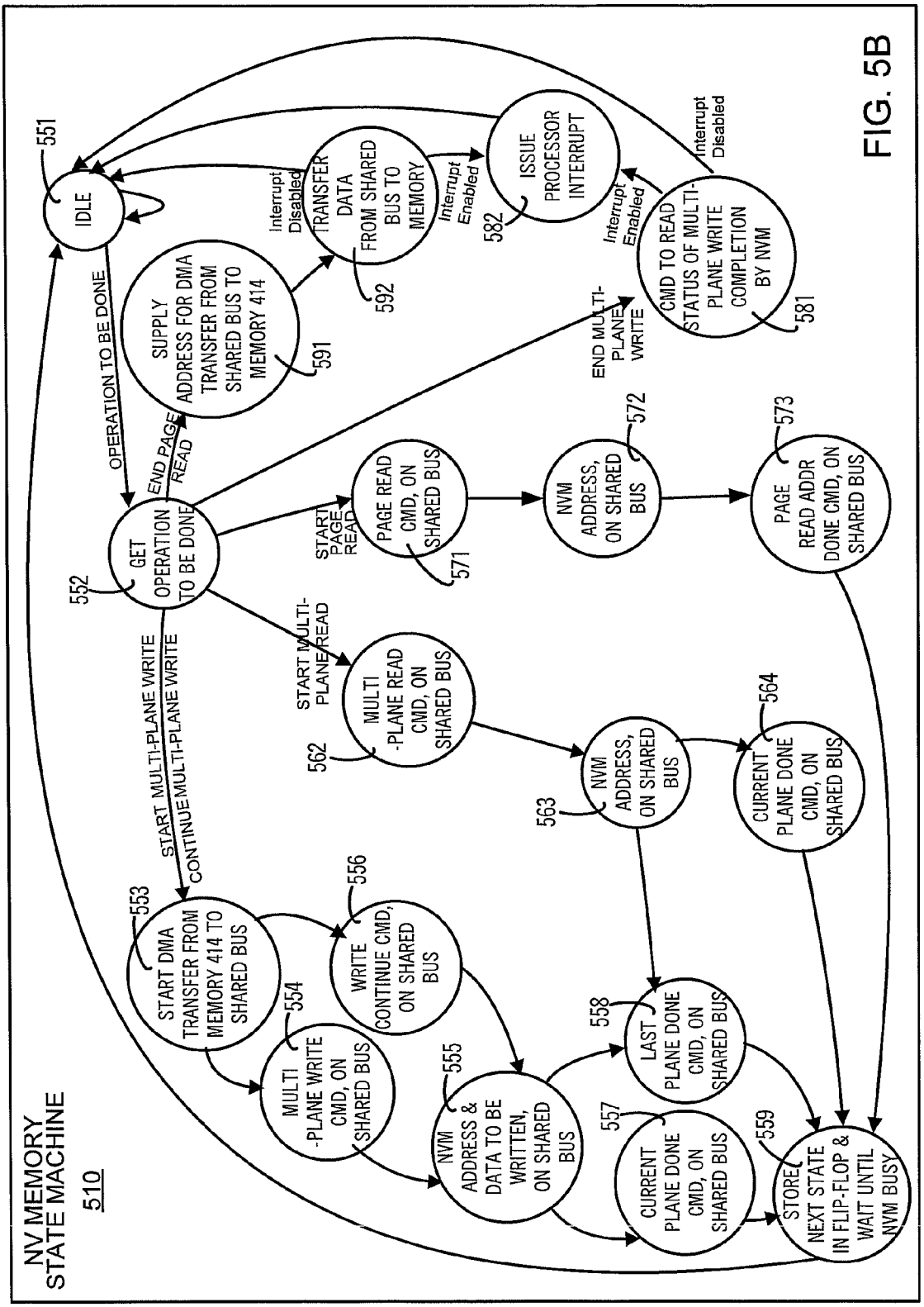
FIG. 5B illustrates multiple states and transitions therebetween, of a state machine 510 included in the illustrative implementation of non-volatile memory interface 200 of FIG. 5A, in some aspects of the invention.
Figure 5C:
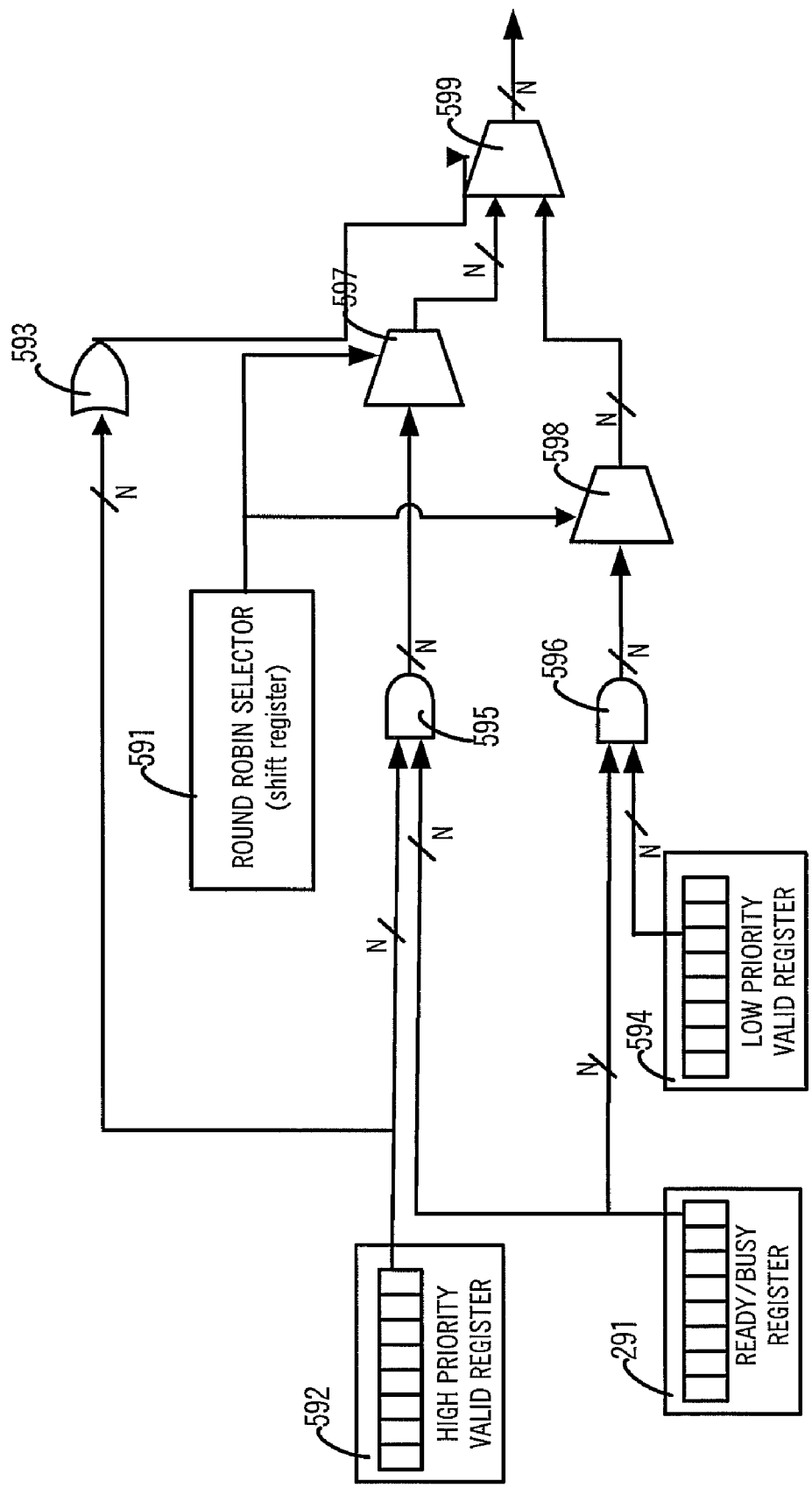
FIG. 5C illustrates, in a low-level block diagram, an example of circuitry used to implement a scheduler 520 of the type illustrated in FIG. 5A, in some aspects of the invention.

An illustrative implementation of an embodiment of the invention includes circuitry of the type illustrated in FIGS. 5A-5C in an NVM interface 200. Specifically, NVM interface 200 includes a state machine ("NVM state machine") 510 that performs an operation identified by a scheduler 520. Specifically, based on the identified operation, NVM state machine 510 reads a corresponding command from a memory ("operation memory") 530 included in NVM interface 200. Memory 530 typically includes a number of storage locations 531A-531M that are used (in act 201 of FIG. 2A as discussed above) to hold valid operations to be performed by NVMs 253A-253N, and related information to suspend and resume performance of the operations. Hence, each storage location 531I is sufficiently large to include one or more bytes identifying an NVM command of the operation 230, and one or more bytes identifying an address within the NVM (e.g. the row and the column therein) at which the NVM command is to be performed.

Additionally in some aspects of the invention, each storage location 531I also includes a predetermined number of priority bits, e.g. four bits or a nibble holding a specific sequence in which respective phases are to be performed. Each priority bit in the sequence indicates whether the corresponding phase is of a high priority or a low priority. One example of a priority sequence is High, Low, Low, Low for four successive phases of a read operation, and another example is the sequence Low, High, High, High for four successive phases of a write operation. Each storage location 531I in these aspects of the invention also includes an interrupt enable bit which indicates whether or not processor 413 is to be interrupted by NVM state machine 510 (e.g. by driving a signal active on line 539) on completion of the operation. Moreover, some embodiments also include in each storage location 531I, a counter PC which identifies a next phase to be performed from among multiple phases of the operation, e.g. after the operation was suspended and is now being resumed. The specific information held in storage locations 531A-531M for each valid operation in NVM interface 200 can be different in other aspects of the invention.

As discussed above, an indication of validity of each operation identified in storage locations 531A-531M is maintained in valid register 292. Accordingly, valid register 292 includes multiple storage elements that are equal in number M, to the number M of storage locations 531A-531M that are used to hold operations in NVM interface 200. Also as noted above, an indication of readiness of each NVMs 253A-253N is maintained in ready-busy register 291. Accordingly, ready-busy register 291 includes multiple storage elements that are equal in number N to the number N of NVMs 253A-253N that are supported by NVM interface 200. Note that the number N of storage elements in ready-busy register 291 need not be same as the number M of storage elements in valid register 292, although in the illustrative implementation M and N are equal, and there is a one-to-one correspondence between NVMs 253A-253N and respective storage locations 531A-531M.

In certain aspects of the invention, a processor bus interface 545 included in NVM interface 200 is coupled by lines 546 to local bus 405 to receive operations to be performed, and on doing so stores them via lines 543 in storage locations 531A-531M, and also uses lines 544 to update the corresponding bits in valid register 292. Processor bus interface 545 is coupled to state machine 510 to receive therefrom via a line 539, a signal to interrupt processor 413, e.g. to indicate completion of an operation. Moreover, processor bus interface 545 is coupled by lines 542 to state machine 510 to supply thereto.

NVM interface 200 of some embodiments also includes a DMA controller 548 that transfer data from an NVM 253I to memory 414, via lines 547 and local bus 405, e.g. during performance of a data phase of a read NVM operation by state machine 510. On completion of the data DMA transfer, DMA controller 548 notifies NVM state machine 510 via a line 514 that DMA has been completed, thereby to cause state machine 510 to start a next phase. Similarly DMA controller 548 can be used to read data from memory 414 when state machine 510 is performing a data phase of a write NVM operation. Note that NVM interface 200 may also include an error correction code (ECC) block 549 that includes an internal buffer. ECC block 549 couples DMA controller 548 to bi-directional bus 221. If an error is detected in the data to/from bi-directional bus 221, ECC block 549 drives a signal active on line 513 that is coupled to NVM state machine 510, thereby to notify state machine 510 of any error in the data.

In some illustrative aspects of the invention, NVM state machine 510 implements the states illustrated in FIG. 5B as follows. Note that state transitions shown in FIG. 5B are illustrative of an example, and different flash devices from different manufacturers use different state transitions and whenever an NVM goes busy, a state machine in accordance with the invention stores state and works on another NVM operation. Moreover, FIG. 5B is merely illustrative of certain aspects described herein, and a corresponding implementation has additional states (e.g. command and address for subsequent planes of a multi-plane operation) of the type readily apparent to a skilled artisan in view of this disclosure. Specifically, NVM state machine 510 initially starts in an idle state 551 (FIG. 5B) and waits therein until an operation to be done is identified, e.g. on lines 523 by scheduler 520 (FIG. 5A). In response, NVM state machine 510 transitions to state 552 (FIG. 5B) and uses lines 516 to retrieve the identified operation from an operation memory 530 (FIG. 5A). Operation memory 530 supplies the identified operation on lines 541 input to NVM state machine 510. Next, depending on the NVM operation received on line 541, NVM state machine 510 transitions to one of multiple states that implement a corresponding one of multiple NVM operations, such as states 553, 562, 571, 581, and 591 (FIG. 5B), described below.

Specifically, on receipt of a multi-plane write NVM operation to be performed by NVM 253I, NVM state machine 510 transitions from state 552 to state 553 (FIG. 5B) and initiates operation of DMA controller 548 (FIG. 5A) to start a DMA transfer of data from memory 414 (FIG. 4A) to NVM bus 221. The reason a DMA transfer is initiated at this stage is that a significant amount of time is typically needed for memory 414 and local bus 405 to begin the DMA transfer. In the interim, as soon as operation of DMA controller 548 is initiated, NVM state machine 510 transitions to state 554 (FIG. 5B) and transmits a multi-plane write command on NVM bus 221 (FIG. 5A) e.g. by generating enable signals CLE, WE# and transmitting them on control lines 221C that are included in NVM bus 221. At this time, while in state 554 (FIG. 5B) NVM state machine 510 also drives a signal active to NVM 253I on a dedicated chip enable line which is included in bus 512 (FIG. 5A).

Thereafter, subsequent to passage of a predetermined amount of time, e.g. 15 nanoseconds (which may be implemented by delay cells) from entering state 554, NVM state machine 510 transitions to state 555 (FIG. 5B). In state 555, an address within NVM 253I (as identified in the current operation) and the data to be written therein are transmitted on input-output lines 221D included in NVM bus 221. Depending on the implementation, address transmission in state 555 may involve multiple column addresses (e.g. 8 least significant bits, followed by 8 most significant bits), as well as multiple row addresses (e.g. three bytes). Note that the data signals on lines 221D are supplied by ECC block 549 that receives corresponding data from DMA controller 548. After a predetermined amount of time, e.g. 15 ns passes from entering state 555, NVM state machine 510 transitions to state 557 (FIG. 5B) if there are additional planes in the current operation, or alternatively transitions to state 558 if the current phase is the last phase in the current operation.

In state 557, NVM state machine 510 transmits a current-plane-done command on bus 221D to the NVM 253I, and after a predetermined amount of time, e.g. 15 ns from entry into state 557, NVM state machine 510 transitions to state 559. State 558 is similar to state 557, except that the command transmitted on bus 221D is the last-plane-done command. On entering state 559, NVM state machine 510 stores the next state in a flip-flop and then waits to receive a busy signal from NVM 253I on a dedicated ready-busy line included in bus 255 (FIG. 5A). On receipt of the busy signal, NVM state machine 510 transitions to the idle state 551 (described above) so that bus 221 can now be used with any other operation that is valid and whose NVM is ready.

When a multi-plane read NVM operation is valid and its NVM 253J is ready, NVM state machine 510 transitions from state 551 to state 552 (FIG. 5B) to retrieve the operation 230 from operation memory 530, as described above. Thereafter, NVM state machine 510 transitions to state 562 (FIG. 5B) and supplies a multi-plane read command on the NVM bus 221. Thereafter, subsequent to passage of a predetermined amount of time, e.g. 15 nanoseconds from entering state 562, NVM state machine 510 transitions to state 563. In state 563, an address within NVM 253J is transmitted on input-output lines 221D (which as described above are included in NVM bus 221). Also depending on the implementation as described above, here as well, address transmission in state 563 may involve multiple column addresses, as well as multiple row addresses (as described above). Next, NVM state machine 510 transitions to state 558 (described above) if the current phase is the last phase, and otherwise transitions to state 564.

In state 564, NVM state machine 510 transmits a current-plane-done command on bus 221D to the NVM 253J, and after a predetermined amount of time, e.g. 15 ns from entry into state 564, NVM state machine 510 transitions to state 559 (described above).

When a single-page read NVM operation is valid and its NVM 253A is ready, NVM state machine 510 transitions from state 551 to state 552 (FIG. 5B) to retrieve the operation 230 from operation memory 530, as described above. Thereafter, NVM state machine 510 transitions to state 571 (FIG. 5B) and supplies a page read command on bus 221D to the NVM 253A. Thereafter, subsequent to passage of a predetermined amount of time, e.g. 15 nanoseconds from entering state 571, NVM state machine 510 transitions to state 572. In state 572, an address within NVM 253A is transmitted on input-output lines 221D. Also depending on the implementation as described above, here as well, address transmission in state 572 may involve multiple column addresses, as well as multiple row addresses (as described above). Next, NVM state machine 510 transitions to state 573. and transmits a page-read-address-done command on bus 221D to the NVM 253A, and after a predetermined amount of time, e.g. 15 ns from entry into state 573, NVM state machine 510 transitions to state 559 (described above).

From state 552, NVM state machine 510 transitions to state 591 if an end page read signal indicating that a page read has been completed. In state 591, NVM state machine 510 supplies an address in memory 414 to which data is to be transferred from the NVM bus 221 by DMA controller 548. Next, NVM state machine 510 goes to state 592. In state 592, NVM state machine 510 initiates DMA transfer of data from NVM bus 221 to memory 414. Thereafter, if interrupts are enabled, as indicated on a line in bus 541 from operation memory 530, state machine 510 transitions to state 582 and alternatively when interrupts are disabled state machine 510 transitions to state 551. In state 582, NVM state machine 510 issues an interrupt and thereafter transitions to state 551.

Similarly, from state 552, NVM state machine 510 transitions to state 581 if a multi-plane write signal indicating that writes on multiple planes have been completed. In state 581, NVM state machine 510 issues a command on input-output lines 221D, to read the status within an NVM 253A of completion of the multi-plane write operation. Thereafter, if interrupts are enabled as noted above, state machine 510 transitions to state 582 and alternatively when interrupts are disabled state machine 510 transitions to state 551.

In an illustrative implementation, NVM state machine 510 (FIG. 5A) includes a scheduler 520 that matches readiness signals latched into ready-busy register 291 from respective NVMs with validity bits latched into validity register 292 (FIG. 5A), to identify one operation to be started next by NVM state machine 510. The just-described functioning of NVM state machine 510 is slightly different in certain implementations that support phase-level priority, e.g. by assigning to each phase, a high priority or a low priority. Accordingly, scheduler 520 matches readiness signals latched into ready-busy register 291 from respective NVMs with validity bits of high priority phases. If there is no high priority phase whose validity bit is set active and whose corresponding NVM is indicating readiness, then scheduler 520 selects a low priority phase whose validity bit is set active and whose corresponding NVM is indicating readiness.

In an illustrative implementation, scheduler 520 (FIG. 5A) is implemented by circuitry of the type illustrated in FIG. 5C, and described next. Specifically, N valid signals of phases currently identified in regions 531A-531N as being at a high priority are supplied by a register 592 as input to NAND gate 595. Also, N readiness signals of these same phases are supplied by register 291 also as input to the same NAND gate 595. An N-bit output of gate 595 is supplied as input to a multiplexer 597. A round-robin selector 591 drives a select signal to multiplexer 597 so that each of N bits at the input of multiplexer 597 is selected in a round-robin manner. Similar to the above-described high priority valid register 592, another register 594 supplies N valid signals of phases that are at a low priority. The output of register 594 is supplied as input to a NAND gate 596. The output of NAND gate 596 in turn is supplied to multiplexer 598. The outputs of multiplexers 597 and 598 are respectively supplied as two inputs to a multiplexer 599.

In one illustrative embodiment, NVM state machine 510 is implemented by an arithmetic logic unit (ALU) that is coupled to a task memory and a microcode memory. Task memory includes a number of sections, each section containing instructions of a different task, e.g. read is command 00h, followed by column address, followed by row address, followed by command 30h, followed by a wait state followed by reading data out. Microcode memory contains steps to execute each instruction, e.g. command 00h is asserting CLE, asserting nWE, driving the value hex 00 onto the flash I/O bus, after certain time deasserting the nWE, then again after certain time deasserting the CLE. Accordingly, instructions of the type illustrated in Appendix A below are transmitted in some illustrative embodiments from processor 413 to NVM state machine 510 for execution therein by the ALU.

The instructions of each operation illustrated in Appendix A are executed by an interpreter in the ALU which interprets each instruction in the task memory by performing the corresponding steps as illustrated in Appendix B below. In an embodiment, each operation is segmented into multiple phases as shown in Appendices A and C, by inserting into an instruction stream for execution by the ALU, one or more instruction(s) "WaitBsySwap" if a condition TB−TR>TS is met as described above. If the condition is not met (e.g. in case of a dummy busy for a multi-plane operation), two instructions "WaitBusyandNoSwap" followed by "WaitReady" are used so that the operation is performed unsegmented. The just-described two Waitbsy instructions both cause the ALU to wait until the ready/busy signal from the NVM is active indicating that the NVM is busy. Then instruction WaitBsySwap activates scheduler 520, checking if a phase of another operation is ready. Effectively, the instruction Waitbsynoswap combines two phases into one phase. The number of phases is defined by the number of WaitBsySwap instructions that are included in an operation: Number of phases=Number of WaitBsySwap instructions+1. In one illustrative embodiment, an NVM operation to be performed is stored locally in an operation memory 530 within NVM interface 200 as a "job-ticket" that also has fields that are used as registers in performing the NVM operation so that swap-in and swap-out thereof is simplified, as described next. Appendices A, B, and C are integral parts of this patent application and are incorporated by reference herein in their entirety.

A job-ticket that is used in one example has 8 words (single plane/two plane flash chips) or 11 words (four plane flash chips). The job-ticket's fields include registers of the corresponding NVM operation. Word 0/1 are modified during execution and are saved during swap out. When an operation represented by a job ticket is swapped out, word1 is saved into an area of operation memory 530 for the job-ticket, for those NVM operations which include transferring data over local bus 405 (e.g. if Word1 specifies an address in a data buffer in memory 414). A predetermined bit in word 0 identifies whether only word0 or both word0 and word1 need to be saved at swap out. Storing only word0 by NVM interface 200 in situations that do not require storing word1 reduces the amount of time required for swap out (e.g. by at least one cycle depending on the implementation). A job-ticket in some embodiments includes the following words:

word0 includes a program counter (PC) which identifies in NVM operation storage an instruction at which execution of the NVM operation is to start, when the NVM operation is swapped in; word0 also identifies one or more variables that indicate the number of times an instruction in the NVM operation is to be performed; word0 also includes a sector count within a page (up to 16 sectors) of each of four planes namely plane0, plane1, plane2 and plane3; word0 also includes one or more chip enable bits to notify the NVM interface 200 as to which virtual channel the current job-ticket belongs to (by default each job-ticket belongs to a corresponding virtual channel, e.g. job-ticket0 for channel0, and job-ticket1 for channel1).

word1 includes an address of a data buffer in memory 414, certain embodiments in accordance with the invention support up to 16 GB of random access memory (e.g. at least 34 bits of address), a list priorities for corresponding phases of the current NVM operation. A predetermined bit in word 1 identifies whether only 8 words are valid, or 11 words are valid in the job ticket. Retrieving only 8 words of a job ticket by NVM interface 200 in situations that do not require retrieving 11 words reduces the amount of time required for swap in of the job ticket (e.g. by at least three cycles depending on the implementation);

word2 includes a row address for plane0 and two or more bits for Interrupt Enable Mask identifying which interrupts are enabled for this NVM operation;

word3 includes a row address for plane1, and an ECC threshold that is used to trigger an interrupt if more than N bits are defective and needed to be corrected (for read only);

word4 includes a column address for plane0 and for plane1;

word5 includes a pointer to identify a logical page number used to recalculate logical to physical table, in case of corrupted internal management data;

word6 includes information about error correction (ECC code), how many bytes to transfer per sector;

word7 includes timing information (e.g. how long to strobe CLE and ALE signals) to access an NVM being used in this current NVM operation, unique to each individual manufacturer of the NVM; and word8, word9 and word10 include row and column address for plane2 and plane3. Note that word8, word9 and word10 are not retrieved by NVM interface 200 in single-plane or 2-plane NVM operations so as to reduce the amount of time required for swap in of the job ticket.

Numerous modifications and adaptations of the aspects described herein will become apparent to the skilled artisan in view of this disclosure. Numerous modifications and adaptations of the aspects described herein are encompassed by the scope of the invention.

APPENDIX A

Note that the commands used below are described in the data sheet entitled "1 G×8 Bit/2 G×8 Bit/4 G×8 Bit NAND Flash Memory" published in 2005 by SAMSUNG Electronics CO., LTD Read ID (Single Phase)
    Command 0x90
    Address
    Read Bytes (N)
    End
Reset (Single Phase)
    Command 0xFF
    WaitBsySwap
    End
EraseBlock (Two Phase)
    Command 0x60
    Row Address
    Command 0xD0
    WaitBsySwap
    Command 0x70
    Read Status Data
    End
ReadPage (Two Phase)
    Command 0x00
    Address
    Command 0x30
    WaitBsySwap
    Read Data (N sectors)
    End
WritePage (Two Phases: First Phase Before WaitBsySwap and Second Phase After WaitBsySwap)
    Command 0x80
    Address
    Write Data (N sectors)
    Command 0x10
    WaitBsySwap
    Command 0x70
    Read Status Data
    End
Write Dual Plane Page (Three Phase)
    Command 0x80
    Address ($1^{st}$ plane)
    Write Data (N sectors)
    Command 0x11
    WaitBsyNoswap
    WaitReady
    Command 0x81
    Address ($2^{nd}$ plane)
    Write Data (N sectors)
    Command 0x10
    WaitBsySwap
    Command 0x81
    Address ($3^{rd}$ plane)
    Write Data (N sectors)
    Command 0x10
    WaitBsySwap
    Command 0x70
    Read Status
    End
ReadCopyPage (Single Phase)
    Command 0x00
    Address
    Command 0x35
    WaitBsySwap
    End
Write CopyPage (Two Phases: First Phase Before WaitBsySwap and Second Phase After WaitBsySwap)
    Command 0x85
    Address
    Command 0x10
    WaitBsySwap
    Command 0x70

Read Status
End

APPENDIX B

Examples of instructions executed by an interpreter in microcode memory of the ALU:
Command
Assert CE
Assert command value taken from task memory on flash I/O bus
Assert CLE and WE for x cycles (x & y taken from job ticket memory area)
Deassert WE for y cycles
ColAdr
Assert CE
Assert column address value taken from job ticket memory on flash I/O bus
Assert WE for x cycles
Deassert WE for y cycles

APPENDIX C

Priority list for illustrative NVM operations in one example:

| OPERATION | PRIORITY | No. of PHASES |
|---|---|---|
| ReadID | High | 1 phase |
| ReadStatus | High | 1 phase |
| ReadSamePage | Low | 1 phase |
| Reset | High | 1 phase |
| EraseBlock | High, High | 2 phases |
| ReadPage | High, Low | 2 phases |
| WritePage | Low, High | 2 phases |
| ReadCopyPage | High | 1 phase |
| WriteCopyPage | High | 2 phases |

The invention claimed is:

1. A method of operating a non-volatile memory controller comprising a processor and a plurality of non-volatile memory interfaces, the method comprising:
   each non-volatile memory interface in the plurality of non-volatile memory interfaces receiving from the processor, multiple non-volatile memory operations to be performed;
   wherein each non-volatile memory interface is coupled to a corresponding group of non-volatile memories;
   wherein each non-volatile memory operation uniquely identifies a non-volatile memory from within said group of non-volatile memories;
   wherein said each non-volatile memory operation comprises a plurality of phases in a predetermined sequence;
   a first non-volatile memory interface in the plurality of non-volatile memory interfaces using a first set of bidirectional input-output pins to communicate with a first non-volatile memory in a first group of non-volatile memories to initiate performance of a first phase of a first non-volatile memory operation;
   wherein a second phase is specified to be performed subsequent to said first phase, in the first non-volatile memory operation;
   the first non-volatile memory interface using said first set of bidirectional input-output pins to further communicate with the first non-volatile memory to initiate performance of a second phase of the first non-volatile memory operation, subsequent to receipt of a first status signal from the first non-volatile memory indicating readiness of the first non-volatile memory;
   between performance of said first phase and performance of said second phase, said first non-volatile memory interface using said first set of bidirectional input-output pins to communicate with a second non-volatile memory in said first group of non-volatile memories to initiate performance of another phase of another non-volatile memory operation among said multiple non-volatile memory operations, based at least partially on a second status signal from the second non-volatile memory indicating readiness of the second non-volatile memory and said first status signal from the first non-volatile memory indicating busyness of the first non-volatile memory during performance of the first phase.

2. The method of claim 1 further comprising:
   the first non-volatile memory interface selecting said another phase based at least partially on a predetermined duration of usage of said first set of input-output pins by said another phase relative to corresponding predetermined durations of other phases to be performed in said multiple non-volatile memory operations.

3. The method of claim 1 wherein:
   each non-volatile memory operation specifies a plurality of priorities corresponding to the plurality of phases; and
   the method further comprises said first non-volatile memory interface selecting each phase for performance from among phases of multiple non-volatile memory operations based at least partially on a priority specified for said each phase.

4. The method of claim 1 wherein:
   the first status signal from the first non-volatile memory is received by the first non-volatile memory interface on a first input pin thereof coupled in a dedicated manner to the first non-volatile memory; and
   the second status signal from the second non-volatile memory is received by the first non-volatile memory interface on a second input pin thereof coupled in said dedicated manner to the second non-volatile memory.

5. The method of claim 1 wherein:
   each non-volatile memory interface comprises a plurality of buffers, each buffer comprising a group of storage locations, each buffer having stored therein a non-volatile memory operation received from the processor, a validity storage location in the group of storage locations being written by the processor to indicate validity of said non-volatile memory operation to said each non-volatile memory interface.

6. The method of claim 5 wherein:
   the first non-volatile memory interface selects said another phase of said another non-volatile memory operation from among said multiple non-volatile memory operations based on a corresponding plurality of validity signals stored in a plurality of validity storage locations in the first non-volatile memory interface by the processor; and
   the plurality of validity storage locations comprise at least said validity storage location.

7. The method of claim 1 wherein:
   the first non-volatile memory interface comprises a plurality of input pins individually coupled to the non-volatile memories in the first group;
   the first non-volatile memory interface receives from said plurality of input pins a plurality of status signals comprising at least said first status signal and said second status signal;

the first non-volatile memory interface further comprising a plurality of output pins coupled in a shared manner to the first group of non-volatile memories;

the first non-volatile memory interface transmits on said plurality of output pins an address latch enable signal, a command latch enable signal, a read enable signal, a write enable signal and a write protect signal;

the first non-volatile memory interface further comprises a plurality of additional output pins individually coupled to the non-volatile memories in the first group; and simultaneous with transmitting a plurality of signals on said plurality of output pins, the first non-volatile memory interface transmitting a chip enable signal on one of the additional output pins.

8. The method of claim 1 wherein:

each non-volatile memory operation specifies a unique address;

performance of said first phase is initiated at said unique address in a first plane in the first non-volatile memory; and performance of said second phase is initiated at said unique address in a second plane in the first non-volatile memory.

9. A non-volatile memory controller to control transfer of data to and from a plurality of non-volatile memories, the non-volatile memory controller comprising:

a plurality of groups of control ports in one-to-one correspondence with the plurality of non-volatile memories;

wherein a control port in the plurality of groups comprises at least an input pin to independently receive a readiness signal individually from a corresponding non-volatile memory in the plurality of non-volatile memories, said control port further comprising at least an output pin to transmit an enable signal to the corresponding flash memory;

a plurality of storage elements in one-to-one correspondence with the plurality of groups of control ports;

wherein a storage element in the plurality of storage elements stores at least one bit indicative of validity of at least one corresponding operation to be performed on the corresponding non-volatile memory;

a circuit coupled to the plurality of storage elements to receive at least said one bit from each storage element, the circuit being further coupled to the plurality of groups of control ports to receive at least the readiness signal from each control port;

wherein the circuit transmits at least an enable signal to the corresponding non-volatile memory via the output pin in the corresponding control port in response to at least simultaneously (a) said one bit indicative of validity of said at least one corresponding operation being active, and (b) said readiness signal from said corresponding non-volatile memory being active.

10. The non-volatile memory controller of claim 9 wherein:

each storage element further holds a second bit indicative of validity of at least a second corresponding operation to be performed on the corresponding non-volatile memory.

11. The non-volatile memory controller of claim 9 further comprising:

a plurality of additional storage elements in one-to-one correspondence with the plurality of groups of control ports;

wherein each additional storage element holds a third bit indicative of priority of said at least one corresponding operation; and wherein said circuit is further coupled to said plurality of additional storage elements.

12. The non-volatile memory controller of claim 9 wherein the circuit comprises:

a logic to generate at least said enable signal; and a memory coupled to the logic, wherein the memory comprises a plurality of instructions to be executed by the logic to initiate performance of said at least one corresponding operation.

* * * * *